(12) United States Patent
Kim et al.

(10) Patent No.: US 9,381,466 B2
(45) Date of Patent: Jul. 5, 2016

(54) EXHAUST GAS PURIFICATION SYSTEM

(71) Applicant: KOREA INSTITUTE OF MACHINERY & MATERIALS, Daejeon (KR)

(72) Inventors: Hong Suk Kim, Daejeon (KR); Gyu Baek Cho, Daejeon (KR); Jun Ho Lee, Daejeon (KR); Seok Hwan Lee, Daejeon (KR); Yong Gyu Lee, Daejeon (KR); Se-Jong Woo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 508 days.

(21) Appl. No.: 13/855,113

(22) Filed: Apr. 2, 2013

(65) Prior Publication Data

US 2013/0259755 A1    Oct. 3, 2013

(30) Foreign Application Priority Data

Apr. 3, 2012  (KR) .......................... 10-2012-0034670
Dec. 13, 2012  (KR) .......................... 10-2012-0145178
Dec. 13, 2012  (KR) .......................... 10-2012-0145181

(51) Int. Cl.
| | |
|---|---|
| *B01D 50/00* | (2006.01) |
| *B01D 53/92* | (2006.01) |
| *B01D 53/94* | (2006.01) |
| *B01D 53/90* | (2006.01) |
| *F01N 3/20* | (2006.01) |

(52) U.S. Cl.
CPC ............... *B01D 53/92* (2013.01); *B01D 53/90* (2013.01); *B01D 53/9431* (2013.01); *F01N 3/208* (2013.01); *F01N 3/2066* (2013.01); *B01D 2259/128* (2013.01); *F01N 2610/08* (2013.01); *F01N 2610/10* (2013.01); *F01N 2610/11* (2013.01); *F01N 2610/12* (2013.01); *F01N 2610/14* (2013.01); *F01N 2610/148* (2013.01); *Y02T 10/24* (2013.01)

(58) Field of Classification Search
CPC . F01N 2510/11; F01N 2610/08; F01N 3/208; B01D 2259/128; B01D 53/90; B01D 53/92
USPC .................................. 422/168, 170, 174, 183
See application file for complete search history.

(56) References Cited

U.S. PATENT DOCUMENTS

| | | | | |
|---|---|---|---|---|
| 6,063,350 | A | * | 5/2000 | Tarabulski et al. .......... 423/239.1 |
| 7,712,307 | B2 | * | 5/2010 | Braun et al. ..................... 60/297 |
| 2005/0013756 | A1 | * | 1/2005 | Amou et al. ............... 423/239.1 |

(Continued)

FOREIGN PATENT DOCUMENTS

| | | |
|---|---|---|
| EP | 2014348 | 1/2009 |
| EP | 2455338 | 5/2012 |

(Continued)

*Primary Examiner* — Tom P Duong
(74) *Attorney, Agent, or Firm* — Lex IP Meister, PLLC

(57) ABSTRACT

The present invention relates to a technology of reducing nitrogen oxide (NOx) which is harmful discharge gas discharged from an internal combustion engine or a combustor, and to an exhaust gas purification system which inputs solid ammonium salt such as ammonium carbamate or ammonium carbonate into a reactor, thermally decomposes and converts the solid ammonium salt into the ammonia by using engine cooling water, exhaust gas, or an electric heater, which are installed in the reactor, and reduces the nitrogen oxide included in the exhaust pipe on a selective catalytic reduction into nitrogen by injecting the ammonia by using a pressure regulator and a dosing valve.

32 Claims, 20 Drawing Sheets

(56) References Cited

U.S. PATENT DOCUMENTS

| | | |
|---|---|---|
| 2005/0207936 A1* | 9/2005 | Berryhill et al. .............. 422/63 |
| 2007/0079599 A1* | 4/2007 | Osaku et al. .................. 60/283 |
| 2007/0113544 A1* | 5/2007 | Nishina et al. ................ 60/286 |
| 2012/0036838 A1* | 2/2012 | Furuya ........................... 60/285 |
| 2012/0045378 A1 | 2/2012 | Soukhojak |
| 2013/0240067 A1* | 9/2013 | Kassel et al. ............. 137/565.01 |

FOREIGN PATENT DOCUMENTS

| | | |
|---|---|---|
| JP | 05-272331 | 10/1993 |
| JP | 4873580 | 1/2001 |
| JP | 2008-546968 | 12/2008 |
| JP | 2009-524765 | 7/2009 |
| JP | 2012-052476 | 3/2012 |
| KR | 10-0535784 | 12/2005 |
| KR | 10-0924591 | 10/2009 |
| KR | 10-2010-0053021 | 5/2010 |
| KR | 10-2010-0132310 | 12/2010 |
| KR | 10-0999571 | 12/2010 |
| KR | 10-0999574 | 12/2010 |
| KR | 10-2011-0010711 | 2/2011 |
| KR | 10-2012-0009332 | 2/2012 |

\* cited by examiner

→ Ammonia supply direction
➡ Air supply direction
⇨ Exhaust gas supply direction → Ammonia supply direction
⇨ Exhaust gas supply direction → Ammonia supply direction
➡ Air supply direction
⇨ Exhaust gas supply direction → Ammonia supply direction
➙ Air supply direction
⇒ Exhaust gas supply direction

EXHAUST GAS PURIFICATION SYSTEM

CROSS-REFERENCE TO RELATED APPLICATION

This application claims priority to and the benefit of Korean Patent Application Nos. 10-2012-0034670, 10-2012-0145178, and 10-2012-0145181, filed in the Korean Intellectual Property Office on Apr. 3, 2012, Dec. 13, 2012, and Dec. 13, 2012, the entire contents of which are incorporated herein by reference.

BACKGROUND OF THE INVENTION (a) Field of the Invention

The present invention relates to an exhaust gas purification system, and more particularly, to an exhaust gas purification system capable of reducing harmful materials included in exhaust gas of a vehicle by using solid ammonium salt.

(b) Description of the Related Art

In general, as a technology of reducing nitrogen oxide discharged from an internal combustion engine, particularly a diesel engine, a method of reducing concentration by exhaust gas recirculation (EGR), and a selective catalytic reduction (SCR) which reduces the nitrogen oxide into nitrogen and oxygen by allowing the nitrogen oxide to react on a catalyst by using a reducing agent such as ammonia, urea, or hydrocarbon are used.

In a case in which hydrocarbon such as diesel oil is used in the technology of the selective catalytic reduction, there is a merit in that a subsidiary reducing agent supply apparatus is not necessary because fuel of an internal combustion engine or a combustor is used as a reducing agent, however in a case in which oxygen is present in the exhaust gas, there is a drawback in that performance for reducing the nitrogen oxide is low, because the hydrocarbon reacts with the oxygen in advance.

Considering a technology of the selective catalytic reduction which uses liquid urea, which is another technology of the selective catalytic reduction, when liquid urea, which is made by dissolving urea, which is a material that is present in a solid state at a room temperature, in water, is injected to an exhaust pipe of a vehicle, the liquid urea is converted into ammonia by being thermally decomposed at a temperature equal to or greater than about 150° C., and the ammonia produced as described above reduces the nitrogen oxide into harmless nitrogen with the help of the selective catalytic reduction such as vanadium pentoxide $V_2O_5$ or zeolite. The technology of the selective catalytic reduction, which uses the liquid urea, has a merit in that a temperature band of a catalytic reaction is wide, durability is excellent, and high nitrogen oxide purification efficiency of about 60 to 80% may be obtained.

However, because the technology of the selective catalytic reduction using liquid urea as illustrated in FIG. 1 uses the liquid urea by mixing with water, there is a drawback in that a storage container in which the liquid urea is stored becomes unnecessarily huge. In addition, the exhaust gas purification system using the liquid urea has a drawback in which subsidiary devices such as a storage container 3 for storing the liquid urea, a pump 5, an injection module 4, a mixer 6, and the like are required. In addition, as the liquid urea remains in the purification system after an engine is stopped, and the remaining liquid urea becomes frozen by an outside environment at a low temperature (equal to or less than −11° C.), an operation of purifying the exhaust gas is not performed, and damage occurs to the entire system.

In order to complement the aforementioned drawback of the liquid urea, a technology using solid urea (Korean Patent No. 10-0999571) is suggested, but because a thermal decomposition temperature of the solid urea is about 140° C. which is high, there is a drawback in that a large amount of electrical energy or exhaust heat energy is necessary, and when the thermal decomposition temperature is not maintained in the reactor or a pipe, the ammonia is coagulated in the pipe or the like. Further as illustrated in FIG. 2, in addition to the ammonia 3, by-products such as isocyanic acid (HNCO) and cyanuric acid are produced during a process of thermally decomposing the solid urea 2, and as the by-products are cooled and coagulated in a solid state in a pipe, a valve, and a nozzle, as illustrated in FIG. 3, after the engine is stopped, various problems such as damage to a valve, blockage of a nozzle and a pipe, deterioration in purification efficiency and the like occur.

In addition, in the technology using the solid urea, because a period of time until the ammonia is produced by the thermal decomposition of the solid urea at the time of starting a vehicle is necessary, there is a problem in that the exhaust gas, which is not purified, is discharged to the atmosphere during the period of time until the ammonia is produced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an exhaust gas purification system in which a problem with a social infrastructure for supplying the liquid urea may be solved by forming solid ammonium salt as a module type for easy mounting instead of using liquid urea and allowing the solid ammonium salt to be used while being replaced at a maintenance place in order to remove nitrogen oxide, and a structure is simple because a separate liquid storage container having a large volume and a liquid injection system are not required.

In addition, the present invention provides a nitrogen oxide purification system using solid ammonium salt and selective catalytic reduction and a solid ammonium salt reactor used therein, capable of being operated for a period of time that is three and four times longer than that of the related art which uses liquid urea even when a container having the same storage capacity is used, by using the solid ammonium salt of which the content of the ammonia is three to four times greater than that of the liquid urea.

In addition, the present invention provides a solid ammonium salt reactor which uses an amount of electrical energy smaller than that of the related art which uses solid urea, and does not produce by-products, by using the solid ammonium salt such as ammonium carbamate or ammonium carbonate of which a thermal decomposition temperature is about 60° C. which is low.

Meanwhile, the present invention provides an exhaust gas purification system, which may prevent a problem that occurs when the ammonia, which is supplied for purifying the exhaust gas, remains in an ammonia supply line, a valve, and a nozzle and is cooled and coagulated in a solid state, and may prevent the exhaust gas from being discharged to the atmosphere in a state of not being purified during a delay time until the ammonia is produced and supplied from the main reactor at the time of starting an engine, by producing and supplying the ammonia at the same time of starting a vehicle.

An exemplary embodiment of the present invention provides an exhaust gas purification system including: a main reactor configured to produce ammonia from solid ammonium salt; a dosing module connected to the main reactor to adjust a supply of the ammonia produced in the main reactor; and an injection nozzle installed in an exhaust pipe to inject the ammonia supplied from the dosing module to the exhaust pipe.

In addition, the exhaust gas purification system may further include a gas supply device configured to supply gas to an ammonia supply line connected between the main reactor and the dosing module.

In addition, the gas supply device may be an air supply device which supplies air to the ammonia supply line.

In addition, the air supply device may be any one of an air tank, a blower, and an air compressor.

In addition, the gas supply device may be an exhaust gas supply device which supplies exhaust gas to the ammonia supply line.

In addition, the exhaust gas supply device may supply the exhaust gas at a rear end side of a diesel particulate filter provided at the exhaust pipe to the ammonia supply line.

In addition, the exhaust gas supply device may be a blower, or an air compressor.

In addition, the gas supply device may be an outside air supply device which supplies outside air, which is supplied to a cylinder by a supercharger, to the ammonia line.

In addition, the outside air supply device may be a blower, or an air compressor.

In addition, an opening and closing valve may be positioned between the gas supply device and the ammonia supply line.

In addition, the opening and closing valve may be a two directional (two-way) valve, or a three directional (three-way) valve.

In addition, a first heating means configured to heat the solid ammonium salt may be provided at the main reactor.

In addition, the first heating means may use at least one of an electric heater, exhaust gas, and cooling water as a heat source.

In addition, at least one of an exhaust gas flow path through which exhaust gas flows, and a cooling water flow path through which cooling water flows, may be formed at the main reactor.

In addition, the exhaust gas flow path may be connected to an exhaust gas inlet pipe into which the exhaust gas flows from the exhaust pipe, and an exhaust gas outlet pipe which allows the flowing exhaust gas to flow out to the exhaust pipe.

In addition, a blower may be coupled to the exhaust gas outlet pipe.

In addition, the main reactor may include a housing having an internal space in which the solid ammonium salt is accommodated and having one side which is opened, a cover coupled to the opened one side of the housing; and a sensor unit provided at the cover.

In addition, the sensor unit may include at least one of a pressure sensor, and a temperature sensor.

In addition, a third heating means may be provided at the dosing module.

In addition, the third heating means may use at least one of an electric heater, exhaust gas, and cooling water as a heat source.

In addition, the dosing module may include at least one of an exhaust gas flow path through which exhaust gas flows and a cooling water flow path through which cooling water flows.

In addition, the dosing module may include: a valve body; an ammonia flow path formed to penetrate the valve body; a pressure regulator provided at the ammonia flow path to adjust ammonia flow pressure; an adjusting valve provided at the ammonia flow path to adjust a discharge amount of the ammonia; and a temperature sensor provided at the valve body.

In addition, the exhaust gas purification system may further include an auxiliary reactor having an internal space in which solid ammonium is accommodated, and provided at the ammonia supply line, which connects the main reactor and the dosing module, along a length direction of the ammonia supply line.

In addition, the main reactor may include a housing having an internal space in which the solid ammonium is accommodated and having an ammonia outlet formed at one side, and the exhaust gas purification system may further include an auxiliary reactor which is installed in a wall of the housing to have a thickness corresponding to the wall of the housing in which the ammonia outlet is formed and has an internal space therein in which solid ammonium is accommodated.

In addition, the auxiliary reactor may include a fourth heating means which heats the solid ammonium salt.

In addition, the fourth heating means may be an electric heater.

In addition, the auxiliary reactor may be heated at the same time of starting an engine, and a heating operation may be stopped at the same time of stopping the engine.

In addition, the auxiliary reactor may be heated at the same time of starting an engine, and heated before the engine is stopped.

In addition, the exhaust gas purification system may further include a selective catalytic reduction installed in the exhaust pipe to reduce the nitrogen oxide into nitrogen and water by mixing nitrogen oxide included in exhaust gas with the ammonia injected to the exhaust pipe; and an electronic control unit connected to the main reactor and the dosing module to control production and supply of the ammonia.

In addition, the main reactor may include a housing of which one side is formed to be opened, a solid ammonium salt cartridge provided in the housing, a cover coupled to the housing so that the opened one side of the housing is sealed, an outlet formed at the other side of the housing and connected to the ammonia dosing module; and a fifth heating means provided at the housing and connected to the electronic control unit.

In addition, the fifth heating means may use at least one of an electric heater, exhaust gas, and cooling water as a heat source.

In addition, the exhaust gas purification system may further include a temperature sensor and a pressure sensor installed at the housing and connected to the electronic control unit.

In addition, the exhaust gas purification system may further include a nitrogen oxide concentration measurement sensor installed at a rear end of the exhaust pipe where the selective catalytic reduction is installed.

In addition, the exhaust gas purification system may further include an exhaust gas temperature sensor installed at a front end of the exhaust pipe where the selective catalytic reduction is installed, in which a temperature of the dosing module may be adjusted in accordance with the measured temperature.

In addition, the solid ammonium salt may be ammonium-carbamate ($NH_2COONH_4$) or ammonium-carbonate (($NH_4)_2CO_3$).

In the exhaust gas purification system of the present invention, a solid ammonium salt module may be used and replaced at a maintenance place in accordance with a period of maintenance, and therefore there is a merit in that separate social infrastructure construction is not necessary.

In addition, because there is no problem that the purification system of the present invention becomes frozen, there is a merit in that the design and the configuration of the system may be simplified.

In addition, because the solid ammonium salt, which is used in the present invention, has a production amount of the ammonia per the same volume, that is, three to four times more than that of the liquid urea of the related art, there is a merit in that a period of replacing the solid ammonium salt may be lengthened compared to the liquid urea system.

In addition, because the present invention uses ammonium salt such as ammonium carbamate or ammonium carbonate of which a thermal decomposition temperature is about 60° C., which is low, there is a merit in that a small amount of electrical energy is used in comparison with a case in which the solid urea is used, and a by-product is not produced.

DETAILED DESCRIPTION OF THE EMBODIMENTS

Figure 1:
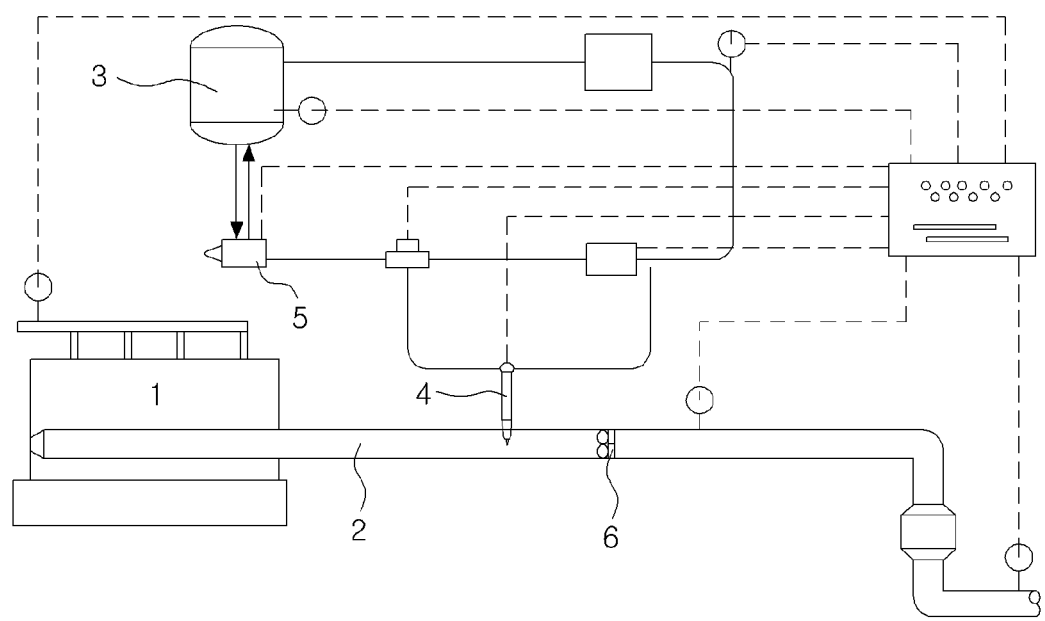
FIG. 1 is a schematic view illustrating a NOx reduction system using liquid urea of the related art.
Figure 2:
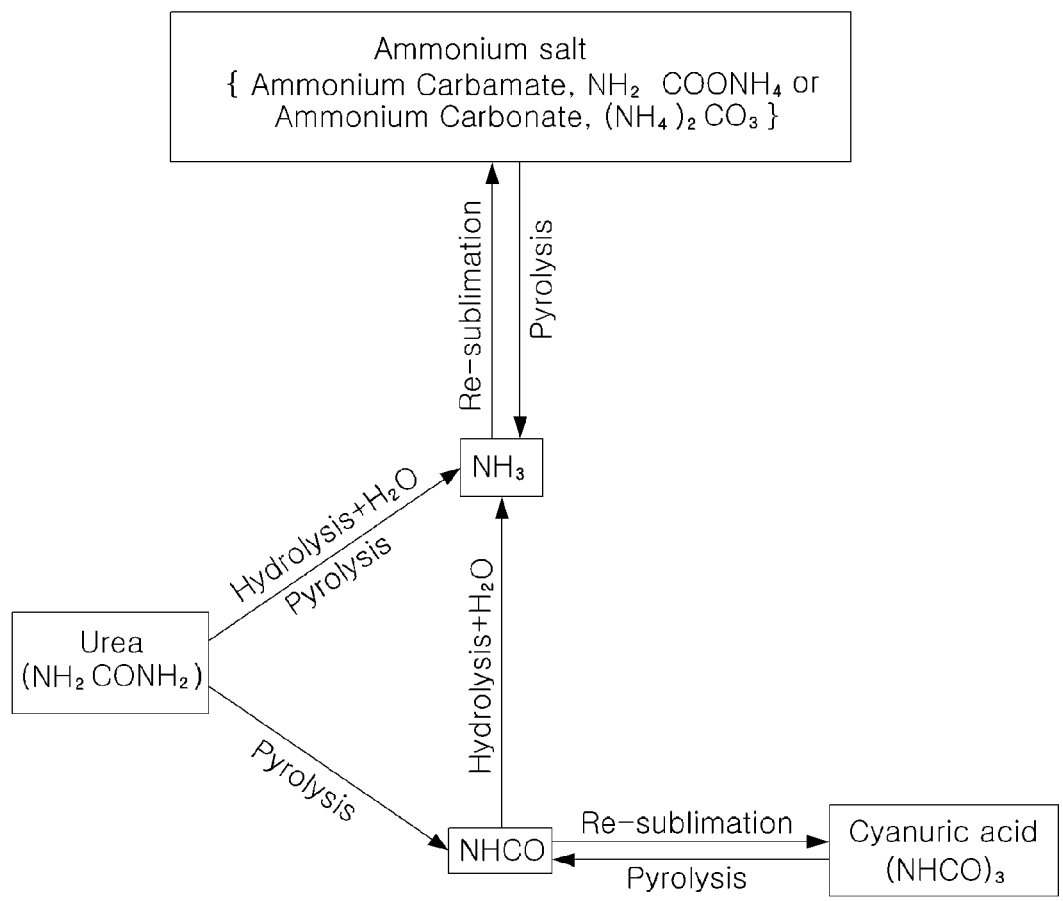
FIG. 2 is a reaction system diagram of solid materials which may produce ammonia.
Figure 3:
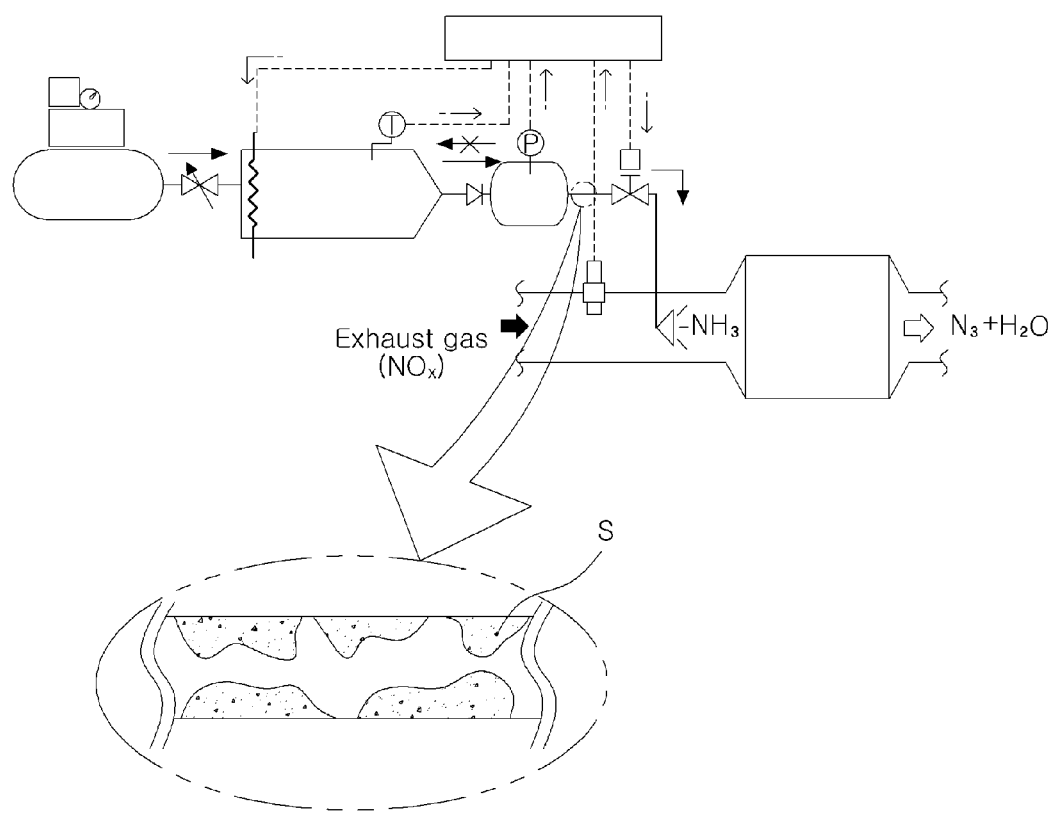
FIG. 3 is a schematic view illustrating a NOx reduction system using solid urea of the related art.
Figure 4:
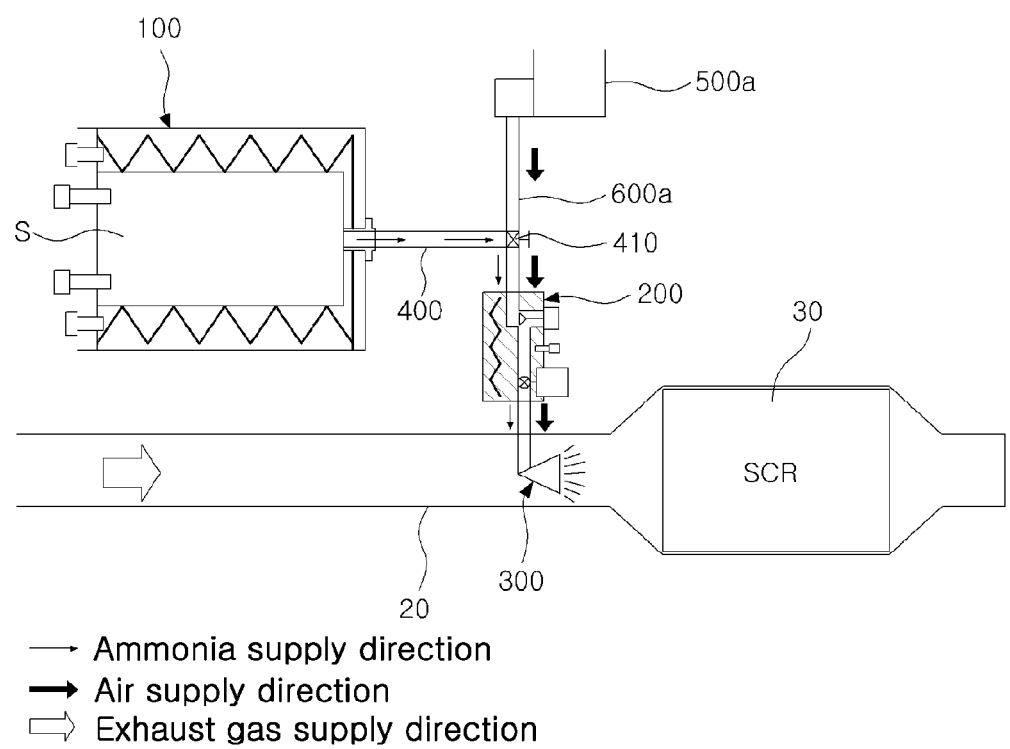
FIG. 4 is a schematic view illustrating an exhaust gas purification system according to a first exemplary embodiment of the present invention.
Figure 5A:
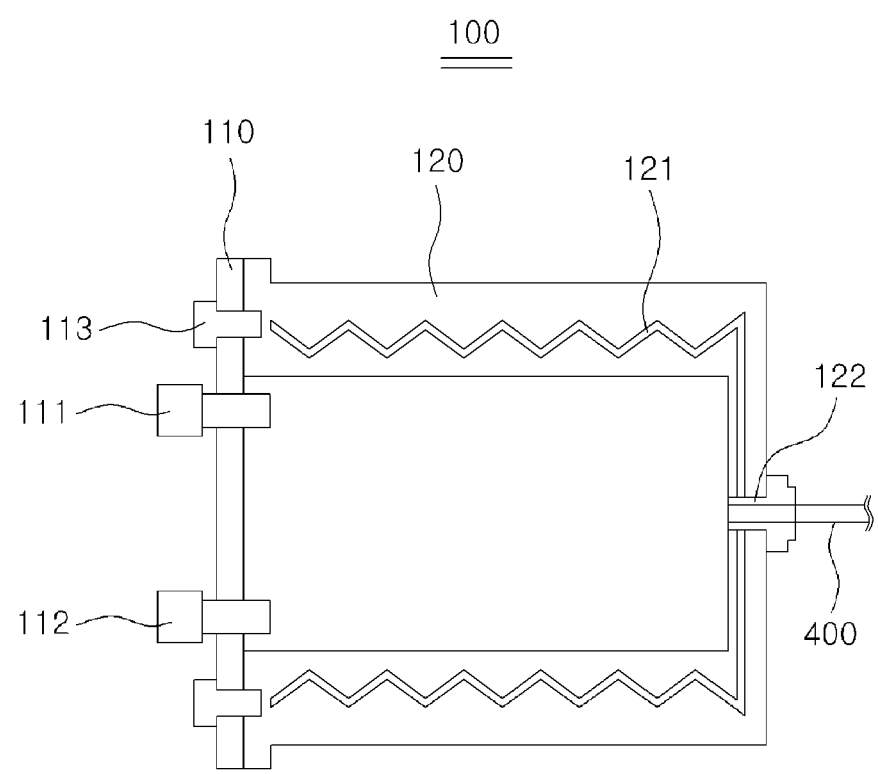
FIGS. 5A to 5C are schematic views illustrating various exemplary embodiments of a main reactor disclosed in FIG. 4.
Figure 5B:
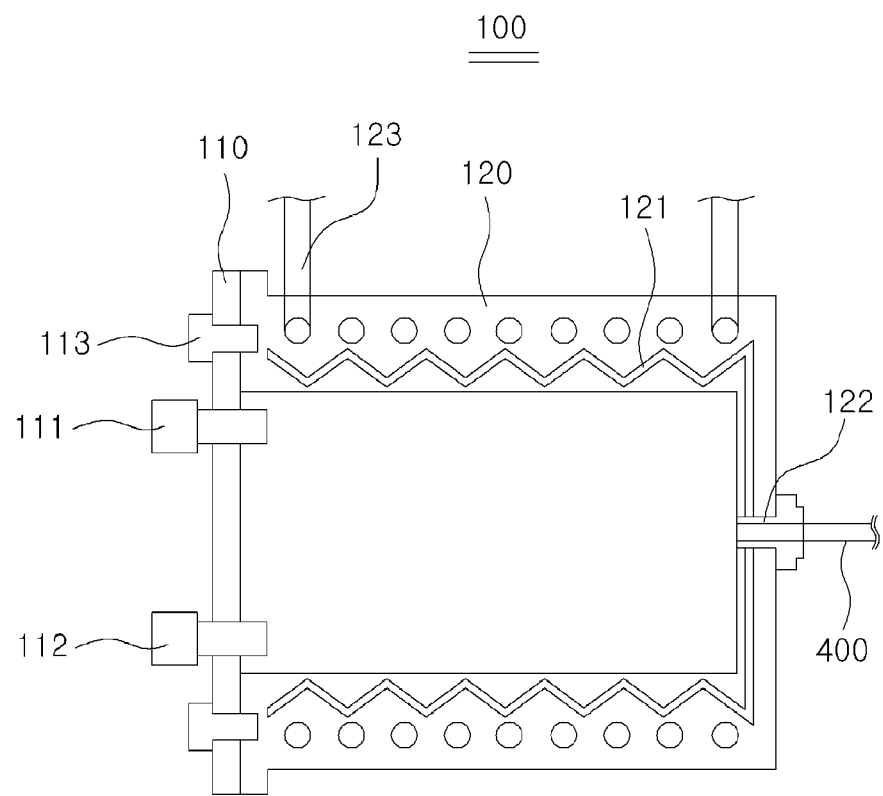
Figure 5C:
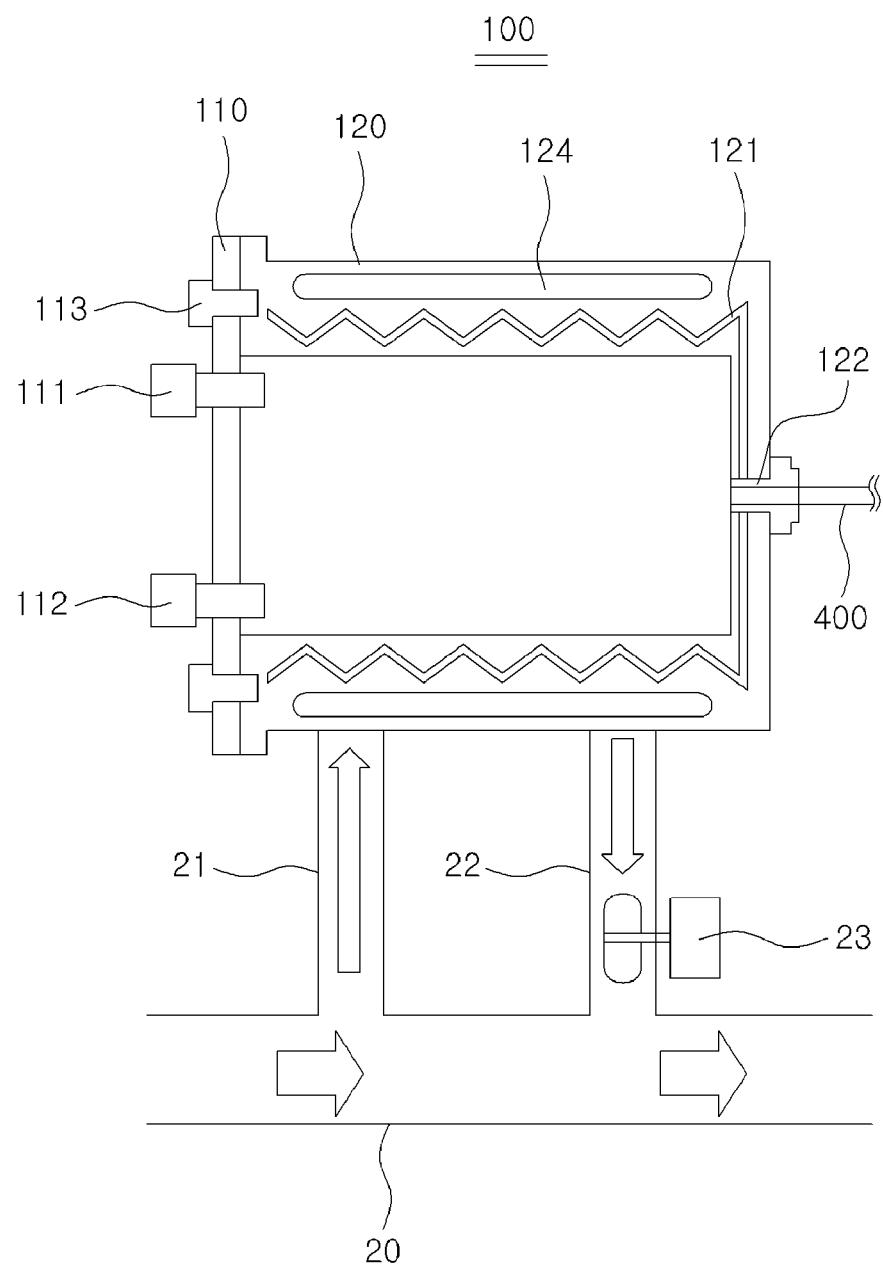
Figure 6A:
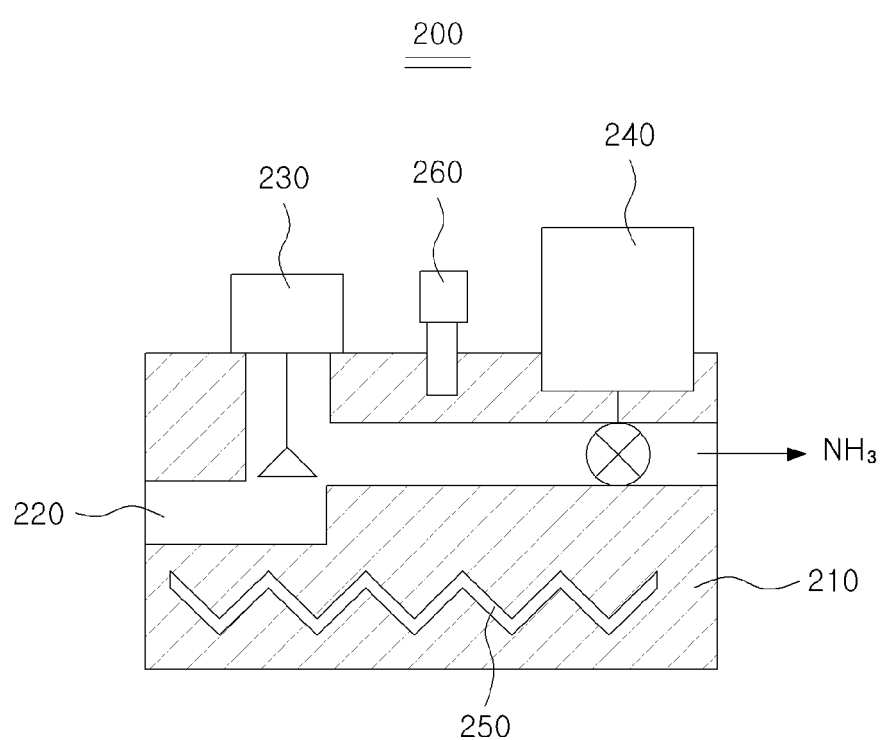
FIGS. 6A to 6C are schematic views illustrating various exemplary embodiments of a dosing module disclosed in FIG. 4.
Figure 6B:
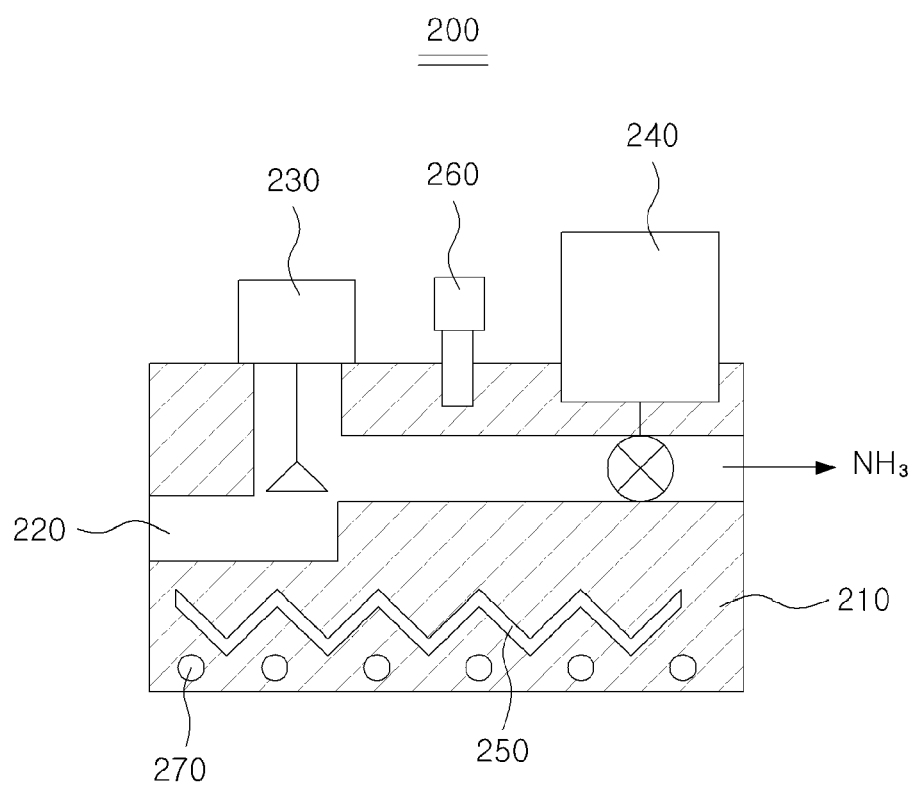
Figure 6C:
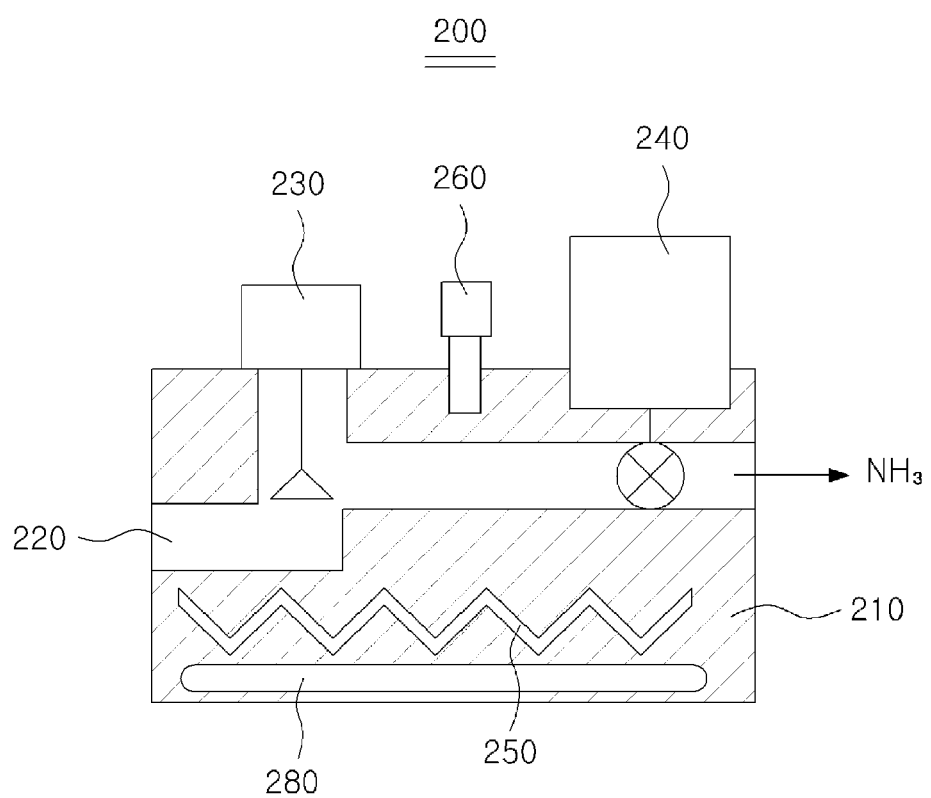

FIG. 4 is a schematic view illustrating an exhaust gas purification system according to a first exemplary embodiment of the present invention. FIGS. 5A to 5C are schematic views illustrating various exemplary embodiments of a main reactor 100 disclosed in FIG. 4. FIGS. 6A to 6C are schematic views illustrating various exemplary embodiments of a dosing module 200 disclosed in FIG. 4.

Referring to FIGS. 4 to 6C, an exhaust gas purification system according to a first exemplary embodiment of the present invention includes a main reactor 100 which produces ammonia by heating solid ammonium salt S. Referring to FIGS. 5A to 5C, the main reactor 100 may include a housing 120 having an accommodating portion formed to accommodate the solid ammonium salt S therein, and an ammonia outlet 122. Here, the housing 120 may have a hermetic structure in a state of accommodating the solid ammonium salt S, or a structure of which one side is opened so that the solid ammonium salt S may be replaced.

In the main reactor 100, in a case in which the housing 120 has a structure of which one side is opened, a cover 110 may be coupled to the opened one side of the housing 120. The cover 110 is detachably coupled to the housing 120, and a temperature sensor 111 or a pressure sensor 112 may be provided at the cover 110.

A first heating means, which heats the solid ammonium salt S accommodated in the housing 120, may be provided at the housing 120. The first heating means may be provided in the housing 120 or provided in a wall of the housing 120. Here, regarding the first heating means, at least one of an electric heater, cooling water and exhaust gas of a vehicle may be used as a heat source.

First, the first heating means may be one of an electric heater, cooling water or exhaust gas of a vehicle. For example, the solid ammonium salt S accommodated in the housing 120 may be heated by only any one heating means among an electric heater 121, cooling water or exhaust gas of a vehicle.

Referring to FIG. 5A, in a case in which the first heating means is the electric heater 121, the electric heater 121 is provided in the wall of the housing 120, and generates heat by electrical energy to heat the solid ammonium salt S accommodated in the housing 120.

Referring to FIG. 5B, in a case in which the first heating means uses the cooling water as a heat source, a cooling water flow path 123, through which the cooling water may flow, may be formed in the wall of the housing 120. The cooling water flow path 123 is formed in a coil shape along the wall of the housing 120 and embedded in the wall. Accordingly, the solid ammonium salt S accommodated in the housing 120 may be heated by circulating the cooling water heated while passing through an engine 10.

Referring to FIG. 5C, in a case in which the first heating means uses the exhaust gas as a heat source, an exhaust gas flow path 124, through which the exhaust gas may flow, may be formed in the wall of the housing 120.

The exhaust gas flow path 124 may be connected to an exhaust gas inlet pipe 21 for allowing the exhaust gas to flow from an exhaust pipe 20 to the exhaust gas flow path 124, and an exhaust gas outlet pipe 22 for allowing the exhaust gas passing through the exhaust gas flow path 124 to flow again to the exhaust pipe 20.

Here, a blower 23 may be provided at the exhaust gas outlet pipe 23 so that the circulation of the exhaust gas may be easily performed. Accordingly, the solid ammonium salt S accommodated in the housing 120 may be heated by heat of the circulating exhaust gas in a high temperature.

In addition to the above description, the first heating means may include two heating means among the electric heater, the cooling water, and the exhaust gas of a vehicle. For example, as illustrated in FIG. 5B, the accommodated solid ammonium salt S may be heated by the electric heater 121 and the cooling water.

Referring to FIG. 5C, the solid ammonium salt S may be heated by the electric heater 121 and the exhaust gas. Here, the solid ammonium salt S may be configured to be heated by the exhaust gas and the cooling water.

Meanwhile, the first heating means may include the electric heater, the cooling water and the exhaust gas of a vehicle, that is, three heating means. Here, the solid ammonium S may be heated by the electric heater, the cooling water and the exhaust gas of a vehicle.

Referring to FIG. 4, the exhaust gas purification system according to the first exemplary embodiment of the present invention includes a dosing module 200 which is provided at an ammonia supply line 400 between the main reactor 100 and an injection nozzle 300. The dosing module 200 may adjust the ammonia, which flows out of the main reactor 100, to be supplied to the injection nozzle 300 in static pressure and in a fixed quantity.

Referring to FIGS. 6A to 6C, the dosing module 200 may include a valve body 210 having an ammonia flow path 220. A pressure regulator 230, which is provided at the ammonia flow path 220 to adjust flow pressure of the ammonia, may be provided at the valve body 210. In addition, an adjusting valve 240, which is provided at the ammonia flow path 220 to adjust a discharge amount of the ammonia, may be provided at the valve body 210.

In addition, a temperature sensor 260 may be further provided to measure a temperature of the valve body 210.

A third heating means for heating the valve body 210 at a temperature equal to or greater than a thermal decomposition temperature of the solid ammonium salt S may be provided at the valve body 210. Here, the third heating means may be formed together with the valve body 210.

Here, the third heating means may use at least one of an electric heater, exhaust gas, and cooling water as a heat source.

Here, in a case in which the third heating means uses the cooling water or the exhaust gas as a heat source, a cooling water flow path 270 or an exhaust gas flow path 280 may be formed in the valve body 210.

The aforementioned dosing module 200 may supply the ammonia flowing out of the main reactor 100 to the injection nozzle 300 in a fixed quantity. In addition, as the valve body 210 is heated at a temperature equal to or greater than a thermal decomposition temperature of the solid ammonium salt S, the ammonia may be prevented from being coagulated in the valve body 210 in a solid state.

Referring to FIG. 4, the exhaust gas purification system according to the first exemplary embodiment of the present invention includes the injection nozzle 300 connected to the dosing module 200. The injection nozzle 300 is disposed at a front end of a selective catalytic reduction (SCR) 30 in the exhaust pipe 20, and may inject the ammonia supplied from the dosing module 200 in a direction to the selective catalytic reduction 30.

The exhaust gas purification system according to the first exemplary embodiment of the present invention includes gas supply devices 500a to 500c capable of supplying gas to the ammonia supply line 400. Here, the supplied gas may be air, exhaust gas, or outside air.

According to the first exemplary embodiment of the present invention, the gas supply device may be an air supply device 500a which supplies air to the ammonia supply line 400. The air supply device 500a may include any one of an air tank, a blower, and an air compressor, and may be connected to the ammonia supply line 400 and an air supply line 600a.

Meanwhile, an opening and closing valve 410 may be provided at a connection point where the ammonia supply line 400 and the air supply line 600a are connected.

The opening and closing valve 410 is a configuration to selectively control the flow of the ammonia and the air which are supplied from the ammonia supply line 400 and the air supply line 600a, and may be a two-directional (two-way) valve or a three-directional (three-way) valve.

In addition, the opening and closing valve 410 may include one-directional (one-way) valves which are provided at the ammonia supply line 400 at a side of the main reactor 100 and the air supply line 600a, respectively. Hereinafter, the description will be given based on a configuration, in which the opening and closing valve 410 is the three directional (three-way) valve, for explanatory convenience.

The exhaust gas purification system according to the first exemplary embodiment of the present invention may include an electronic control unit (not illustrated). The electronic control unit is electrically connected to the main reactor 100, the dosing module 200, the opening and closing valve 410, and a plurality of sensors, and may control production, supply, and flow of the ammonia.

Here, the sensors are sensors for sensing pressure, temperature and nitrogen oxide (NOx), and may be provided at the main reactor 100, the dosing module 200, and the exhaust pipe 20.

Figure 7:
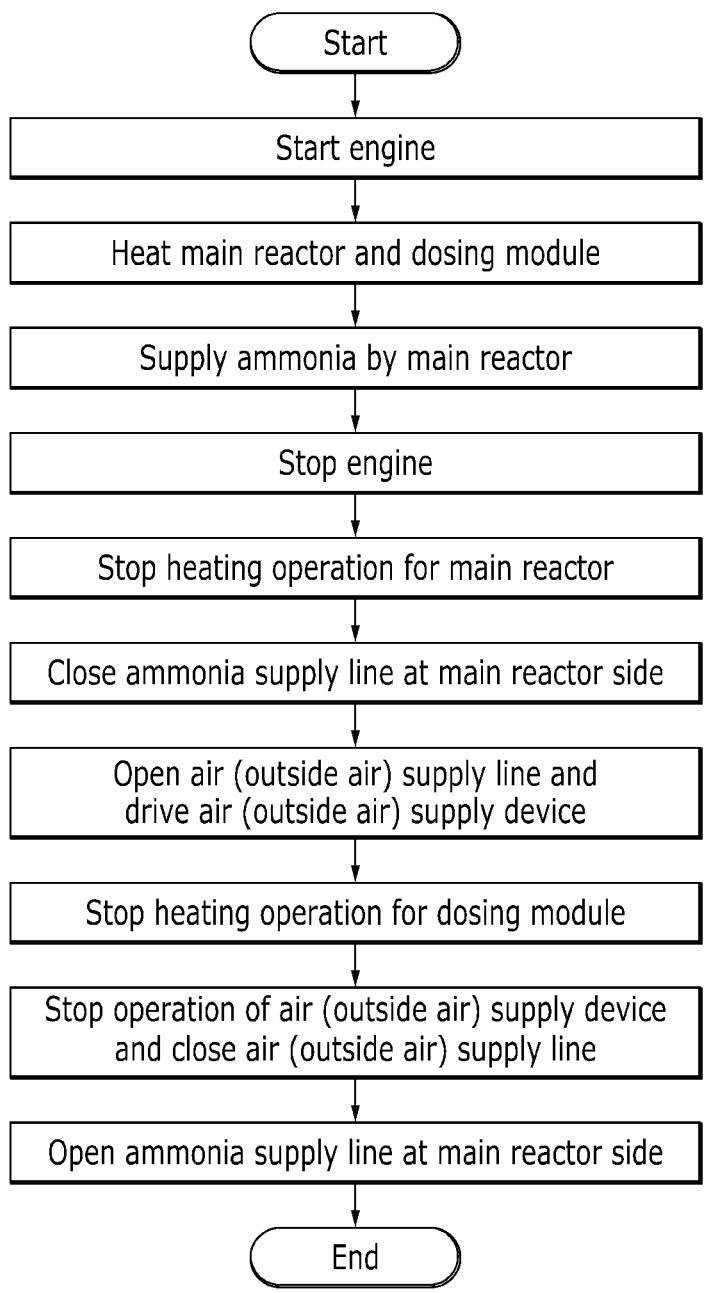
FIG. 7 is a flowchart illustrating an operational sequence of the exhaust gas purification system according to the first exemplary embodiment of the present invention.

FIG. 7 is a flowchart illustrating an operational sequence of the exhaust gas purification system according to the first exemplary embodiment of the present invention.

Hereinafter, a method of operating the exhaust gas purification system according to the first exemplary embodiment of the present invention, which includes the aforementioned configuration, will be described with reference to FIG. 7.

First, when a user starts a vehicle in order to drive the vehicle, the user operates the heating means of the main reactor 100 and the dosing module 200 at the same time of starting the engine. At this time, the heating means, which use the electric heaters 121 and 250 as heat sources, among the heating means, are operated at the same time of starting the engine, and the heating means, which use the exhaust gas or the cooling water as a heat source, are operated with the operation of the heating means, which use the electric heaters 121 and 250 as heat sources, at a predetermined time difference. The reason is that the exhaust gas and the cooling water do not have sufficient thermal energy at the time of starting the engine. In addition, when the exhaust gas or the cooling water has sufficient thermal energy, the heating means, which use the electric heaters 121 and 250 as heat sources, and the heating means, which use the exhaust gas or the cooling water as a heat source, are operated together. In contrast, when the main reactor 100 or the dosing module 200 is excessively heated, the operations of the heating means, which use the electric heaters 121 and 250 as heat sources, are stopped, and only the heating means, which uses the exhaust gas or the cooling water as a heat source, is operated.

Meanwhile, when the main reactor 100 produces the ammonia by heating the solid ammonium salt S by using the heating means, an internal pressure in the main reactor 100 is increased by the produced ammonia. Further, when the internal pressure in the main reactor 100 reaches a predetermined level, the ammonia flows out of the main reactor 100 and flows into the dosing module 200.

The ammonia flowing into the dosing module 200 flows to the injection nozzle 300 in static pressure and in a fixed quantity by the pressure regulator 230 and the adjusting valve 240 which are provided at the valve body 210, and the ammonia flowing into the injection nozzle 300 is injected to the selective catalytic reduction 30 in the exhaust pipe 20 in static pressure and in a fixed quantity and mixed with the exhaust gas.

The exhaust gas mixed with the ammonia is purified by removing nitrogen oxide by the selective catalytic reduction 30, and discharged to the atmosphere.

Meanwhile, when the user stops the engine, the operation of the heating means of the main reactor 100 is stopped so that the ammonia is not produced. In addition, the opening and closing valve 410 is operated at the same time of stopping the operation of the heating means of the main reactor 100 so that the ammonia supply line 400 at the side of the main reactor 100 is closed and the air supply line 600aDeletedTextsis opened.

When the air supply line 600a is opened, air is supplied to the dosing module 200 by driving the air supply device 500a. The air supplied to the dosing module 200 passes through the dosing module 200, and is discharged to the exhaust pipe 20 through the injection nozzle 300. At this time, the ammonia remaining in the ammonia supply line 400, the dosing module 200, and the injection nozzle 300 is discharged together with the discharge of air.

Accordingly, the ammonia supply line 400, the dosing module 200, and the injection nozzle 300 may be prevented from being clogged by the remaining ammonia which is coagulated in a solid state due to a decrease in temperature.

In addition, when the discharge of the remaining ammonia by the air supply device 500a is completed, the operation of the air supply device 500a and the heating operation for the dosing module 200 are stopped. Thereafter, the air supply line 600a is closed and the ammonia supply line 400 is opened by driving the opening and closing valve 410, and as a result the operation of the exhaust gas treatment system according to the first exemplary embodiment of the present invention is ended.

Meanwhile, an operation end time point of the exhaust gas treatment system according to the first exemplary embodiment of the present invention may be a time point when the operation of the air supply device 500a and the heating operation for the dosing module 200 are finished, and in this case, the air supply line 600a is closed and the ammonia supply line 400 is opened by driving the opening and closing valve 410 at the same time of starting the engine.

In addition, the heating operations for the main reactor 100 and the dosing module 200, which are described above, and the operations of the overall configurations including the pressure regulator 230 and the adjusting valve 240 of the dosing module 200 are flexibly controlled by the electronic control unit.

Figure 8:
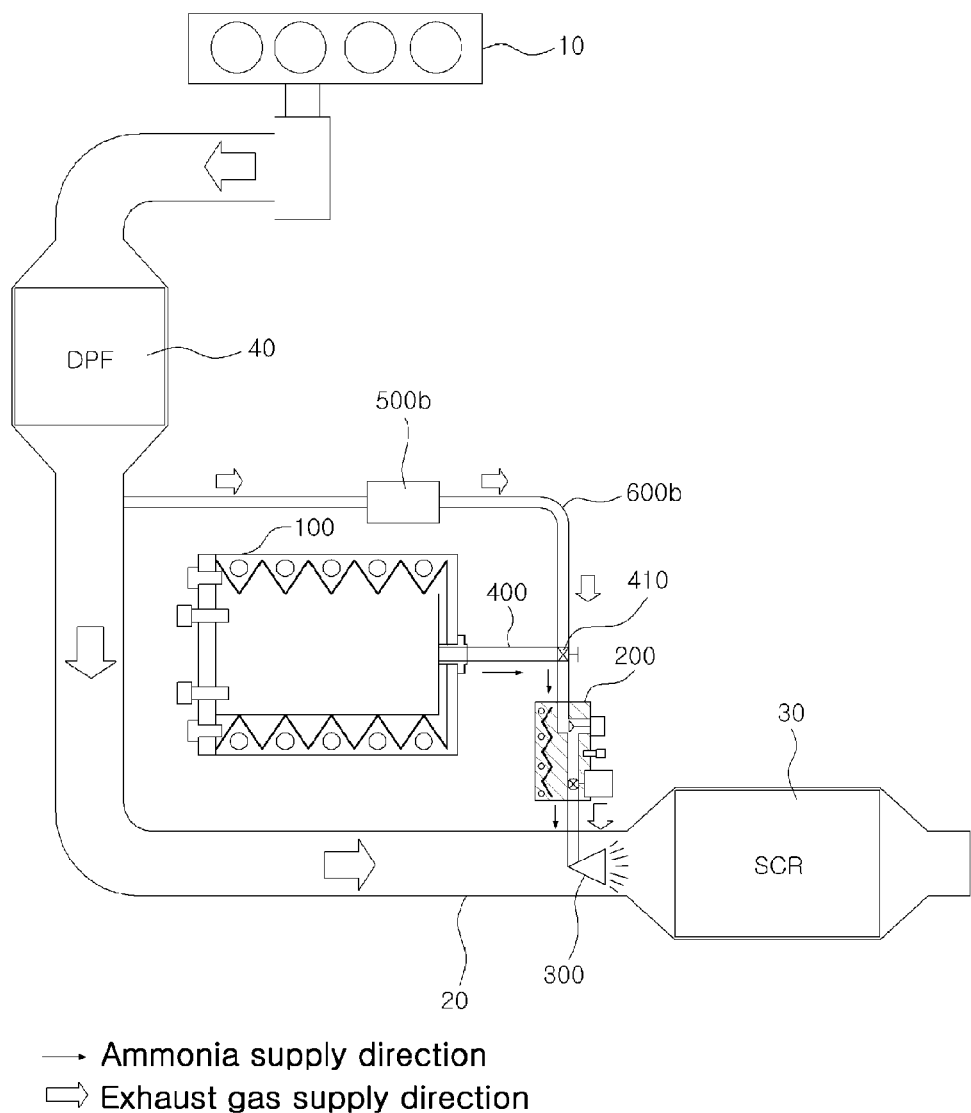
FIG. 8 is a schematic view illustrating an exhaust gas purification system according to a second exemplary embodiment of the present invention.

FIG. 8 is a schematic view illustrating an exhaust gas purification system according to a second exemplary embodiment of the present invention.

Referring to FIG. 8, an exhaust gas purification system according to a second exemplary embodiment of the present invention includes a main reactor 100 which produces ammonia from solid ammonium salt, a dosing module 200 connected to the main reactor 100 to adjust a supply of the ammonia which is discharged from the main reactor 100, an injection nozzle 300 connected to the dosing module 200 and disposed in an exhaust pipe 20 to inject the ammonia to the exhaust pipe 20, and an exhaust gas supply device 500b which supplies the exhaust gas to an ammonia supply line 400 between the main reactor 100 and the dosing module 200.

In addition, the exhaust gas purification system according to the second exemplary embodiment of the present invention may further include an electronic control unit (not illustrated) electrically connected to the main reactor 100, the dosing module 200, the exhaust gas supply device 500b, and a plurality of sensors to control production, supply, and flow of the ammonia.

Here, because the main reactor 100, the dosing module 200, the injection nozzle 300, and the electronic control unit are identical or similar to the aforementioned configurations of the first exemplary embodiment, a specific description thereof will be omitted, and hereinafter a description will be given based on configurations different from those of the first exemplary embodiment.

The exhaust gas supply device 500b is one of a blower or an air compressor, and may be provided at an exhaust gas supply line 600b.

The exhaust gas supply line 600b may have one side connected to the ammonia supply line 400 between the main reactor 100 and the dosing module 200, and the other side connected to the exhaust pipe 20 at a rear end side of a diesel particulate filter 40 provided at the exhaust pipe 20.

Accordingly, the exhaust gas at the rear end side of the diesel particulate filter 40 may be supplied to the ammonia supply line 400 by the exhaust gas supply device 500b.

Here, regarding the reason why the exhaust gas at the rear end side of the diesel particulate filter 40 is supplied, a plurality of particulate matters (PM) due to combustion of fuel is included in the exhaust gas at a front end side of the diesel particulate filter 40.

Accordingly, there is a concern in that when the exhaust gas at the front end side of the diesel particulate filter 40 is supplied to the ammonia supply line 400, the dosing module 200 and the injection nozzle 300 including the ammonia supply line 400 are damaged. Therefore, the exhaust gas in which the particulate matters (PM) are removed while passing through the diesel particulate filter 40 is supplied in order to prevent the concern.

Figure 9:
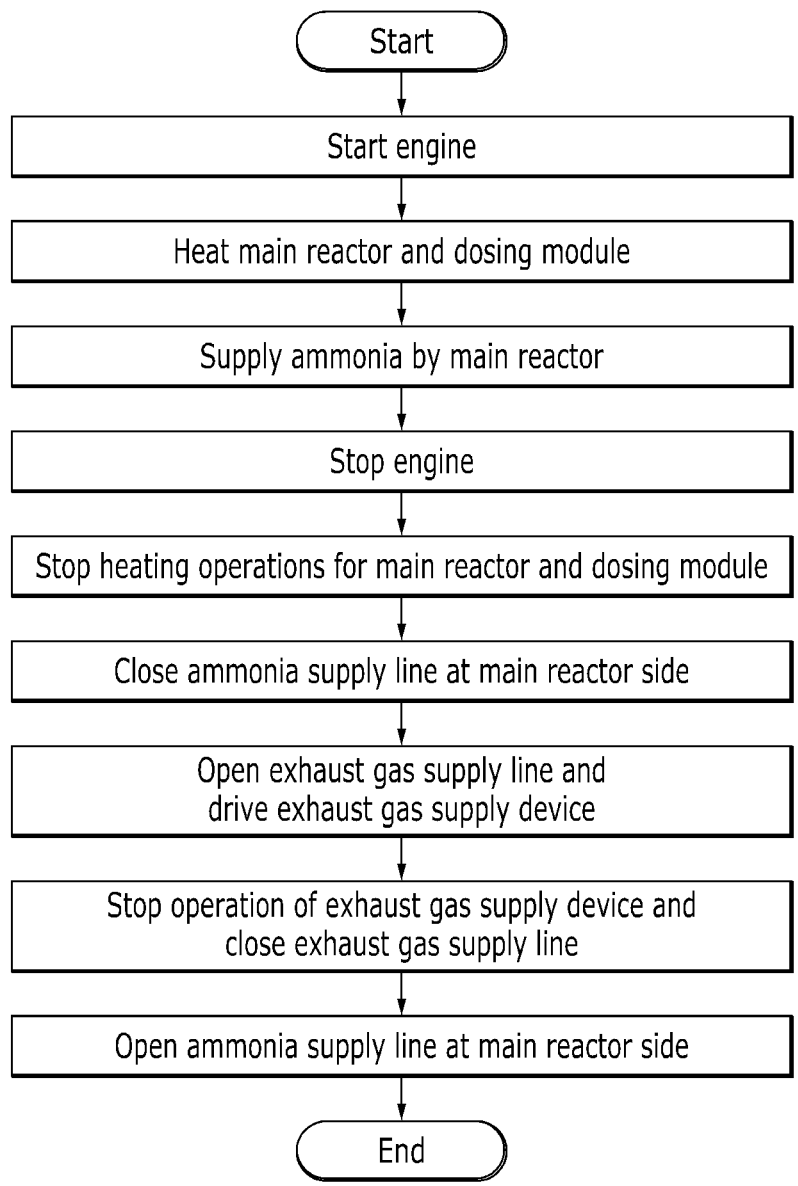
FIG. 9 is a flowchart illustrating an operational sequence of the exhaust gas purification system according to the second exemplary embodiment of the present invention.

FIG. 9 is a flowchart illustrating an operational sequence of the exhaust gas purification system according to the second exemplary embodiment of the present invention.

Hereinafter, a method of operating the exhaust gas purification system according to the second exemplary embodiment of the present invention will be described with reference to FIG. 9. Here, in the method of operating the exhaust gas purification system according to the second exemplary embodiment of the present invention, because the operations before stopping the engine 10 are identical or similar to the operational method of the aforementioned first exemplary embodiment, a specific description thereof will be omitted. Hereinafter, the operational method after stopping the engine 10 will be specifically described.

When a user stops the engine 10, all of the heating means of the main reactor 100 and the dosing module 200 are stopped. Here, the reason why the heating operations for the dosing module 200 and the main reactor 100 are simultaneously stopped in comparison with the first exemplary embodiment is that the dosing module 200 does not need to be heated because the exhaust gas flowing into the dosing module 200 has a high temperature.

Next, the ammonia supply line 400 at a side of the main reactor 100 is closed and the exhaust gas supply line 600b is opened by driving the opening and closing valve 410 at the same time of stopping the operations of the heating means of the main reactor 100 and the dosing module 200.

When the exhaust gas supply line 600b is opened, the exhaust gas is supplied to the dosing module 200 by driving the exhaust gas supply device 500b. Further, the exhaust gas supplied to the dosing module 200 passes through the dosing module 200, and is discharged to the exhaust pipe 20 through the injection nozzle 300. At this time, the ammonia remaining in the ammonia supply line 400, the dosing module 200, and the injection nozzle 300 is discharged together with the discharge of the exhaust gas. Accordingly, the ammonia supply line 400, the dosing module 200, and the injection nozzle 300 may be prevented from being clogged by the remaining ammonia which is coagulated in a solid state due to a decrease in temperature.

In addition, when the discharge of the remaining ammonia is completed by the exhaust gas supply device 500b, the operation of the exhaust gas supply device 500b is stopped. Thereafter, the exhaust gas supply line 600b is closed and the ammonia supply line 400 is opened by driving the opening and closing valve 410, and as a result the operation of the exhaust gas treatment system according to the second exemplary embodiment of the present invention is ended.

In addition, similarly to the first exemplary embodiment, an operation end time point of the exhaust gas treatment system according to the second exemplary embodiment of the present invention may be a time point when the operation of the exhaust gas supply device 500b is finished. This may be controlled by the electronic control unit.

Figure 10:
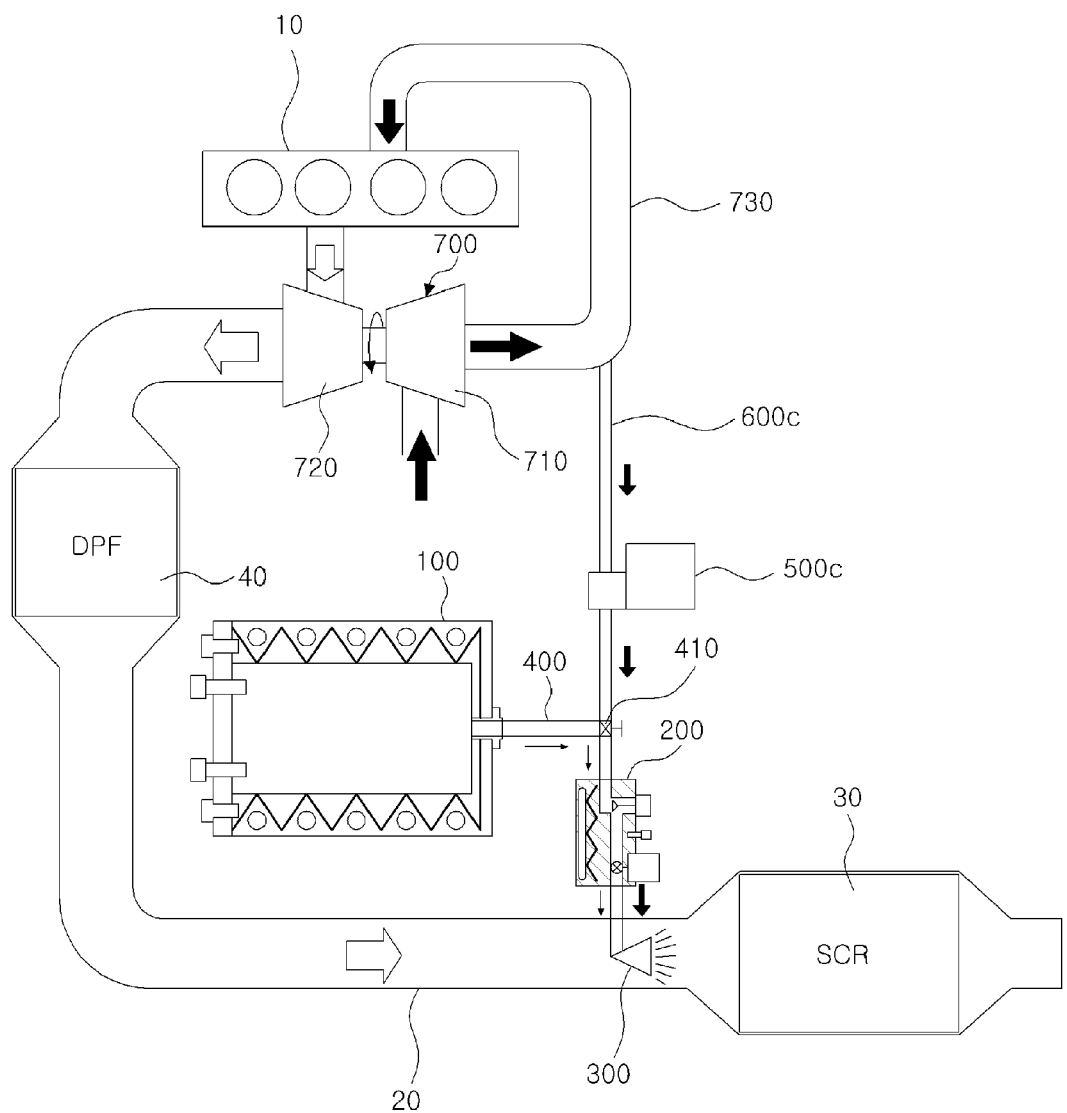
FIG. 10 is a schematic view illustrating an exhaust gas purification system according to a third exemplary embodiment of the present invention.

FIG. 10 is a schematic view illustrating an exhaust gas purification system according to a third exemplary embodiment of the present invention.

Referring to FIG. 10, an exhaust gas purification system according to a third exemplary embodiment of the present invention includes a main reactor 100 which produces ammonia from solid ammonium salt S, a dosing module 200 connected to the main reactor 100 to adjust a supply of the ammonia which is discharged from the main reactor 100, an injection nozzle 300 connected to the dosing module 200 and disposed in an exhaust pipe 20 to inject the ammonia to the exhaust pipe 20, and an outside air supply device 500c which supplies outside air, which is supplied to a cylinder by a supercharger 700, to an ammonia supply line 400 between the main reactor 100 and the dosing module 200.

In addition, the exhaust gas purification system according to the third exemplary embodiment of the present invention may further include an electronic control unit (not illustrated) electrically connected to the main reactor 100, the dosing module 200, the outside air supply device 500c, and a plurality of sensors to control production, supply, and flow of the ammonia.

Here, because the main reactor 100, the dosing module 200, the injection nozzle 300, and the electronic control unit are identical or similar to the aforementioned configurations of the first and the second exemplary embodiments, a specific description thereof will be omitted, and hereinafter a description will be given based on configurations different from those of the exemplary embodiments.

The outside air supply device 500c is one of a blower or an air compressor, and may be provided at an outside air supply line 600c. The outside air supply line 600c may have one side connected to the ammonia supply line 400 between the main reactor 100 and the dosing module 200, and the other side connected to an outside air discharge line 730 provided between the supercharger 700 and the engine 10.

Accordingly, the outside air, which flows through the outside air discharge line 730, may be supplied to the ammonia supply line 400 by the outside air supply device 500c.

Meanwhile, in a method of operating the exhaust gas purification system according to the third exemplary embodiment of the present invention, because there is a difference compared to the first exemplary embodiment in that the outside air supply device 500c is provided correspondingly to the air supply device 500a, the operational method of the third exemplary embodiment may be identical or similar to the operational method of the first exemplary embodiment.

Figure 11:
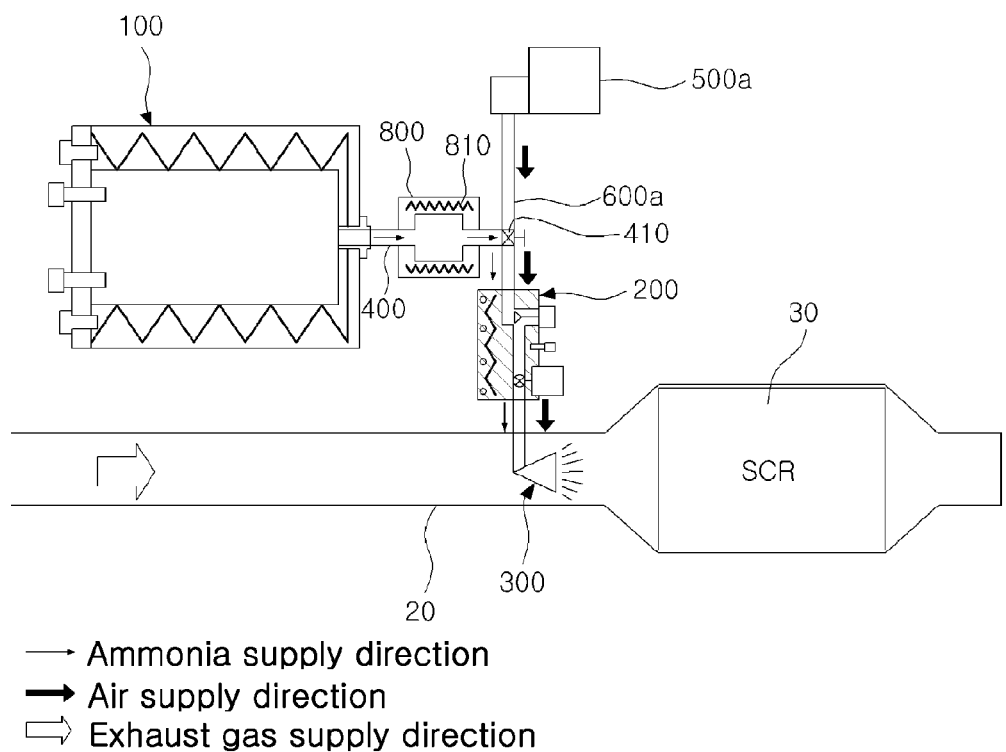
FIG. 11 is a schematic view illustrating an exhaust gas purification system according to a fourth exemplary embodiment of the present invention.
Figure 12:
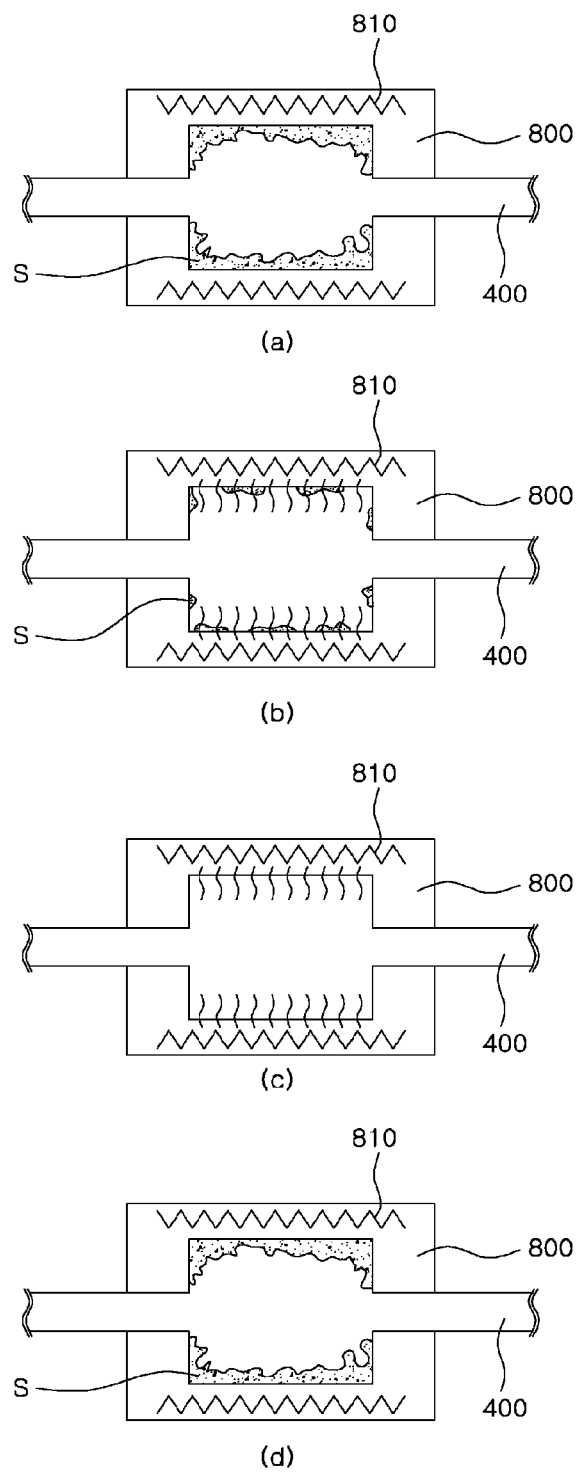
FIG. 12 is a schematic view illustrating an internal state of an auxiliary reactor in accordance with an operation of a fourth heating means disclosed in FIG. 11.

FIG. 11 is a schematic view illustrating an exhaust gas purification system according to a fourth exemplary embodiment of the present invention. FIG. 12 is a schematic view illustrating an internal state of an auxiliary reactor 800 in accordance with an operation of a fourth heating means 810 disclosed in FIG. 11.

Referring to FIGS. 11 and 12, an exhaust gas purification system according to a fourth exemplary embodiment of the present invention includes a main reactor 100 which produces ammonia from solid ammonium salt S, an auxiliary reactor 800 provided at an ammonia supply line 400 connected to the main reactor 100, a dosing module 200 connected to the auxiliary reactor 400 to adjust a supply of the ammonia which is discharged from the main reactor 100 and the auxiliary reactor, and an injection nozzle 300 connected to the dosing module 200 and disposed in an exhaust pipe 20 to inject the ammonia to the exhaust pipe 20.

In addition, the exhaust gas purification system according to the fourth exemplary embodiment of the present invention may further include an electronic control unit (not illustrated) electrically connected to the main reactor 100, the dosing module 200, the auxiliary reactor 800, and a plurality of sensors to control production, supply, and flow of the ammonia.

Here, because the main reactor 100, the dosing module 200, the injection nozzle, and the electronic control unit are identical or similar to the configurations disclosed in the aforementioned exemplary embodiments, a specific description thereof will be omitted, and hereinafter a description will be given based on configurations different from those of the aforementioned exemplary embodiments.

In addition, the exhaust gas purification system according to the fourth exemplary embodiment of the present invention may include any one of the air supply device 500a, the exhaust gas supply device 500b, and the outside air supply device 500c, which are disclosed in the first exemplary embodiment to the third exemplary embodiment, and are connected to the ammonia supply line 400 between the main reactor 100 and the dosing module 200 in order to discharge the remaining ammonia to the outside after the engine is stopped.

The auxiliary reactor 800 is a configuration to supply the ammonia to the exhaust pipe at the same time of starting the engine when the engine is started, and may be provided at the ammonia supply line 400 between the main reactor 100 and the dosing module 200 along a length direction of the ammonia supply line 400.

The auxiliary reactor 800 may have an internal space in which the solid ammonium salt S is accommodated, and an ammonia inlet and an ammonia outlet provided on the same line as the ammonia supply line 400.

In addition, a fourth heating means 810, which heats the solid ammonium salt S accommodated in the internal space, may be provided. Here, the fourth heating means 810 may be an electric heater in order to rapidly heat the accommodated solid ammonium salt S.

The aforementioned auxiliary reactor 800 produces the ammonia by rapidly heating the accommodated solid ammonium salt S, and therefore may prevent the exhaust gas from being discharged to the atmosphere in a state of not being purified during a delay time until the ammonia is discharged after being produced in the main reactor 100.

In addition, at the time of starting the engine, as the solid ammonium salt S accommodated in the auxiliary reactor 800 produces the ammonia while being heated until the ammonia is discharged after being produced in the main reactor 100, the solid ammonium salt S accommodated in the auxiliary reactor 800 may be almost exhausted.

In addition, after the engine is stopped, the remaining ammonia in the ammonia supply line 400 where the auxiliary reactor 800 is provided may be cooled and coagulated in a state of the solid ammonium salt S in an accommodating portion of the auxiliary reactor. That is, the coagulated solid ammonium salt S is converted again into the ammonia at the time of starting the engine, and the exhaustion and the coagulation (production) of the solid ammonium salt S may be repeatedly performed in the accommodating portion of the auxiliary reactor 800 in accordance with whether or not the engine is driven.

Figure 13:
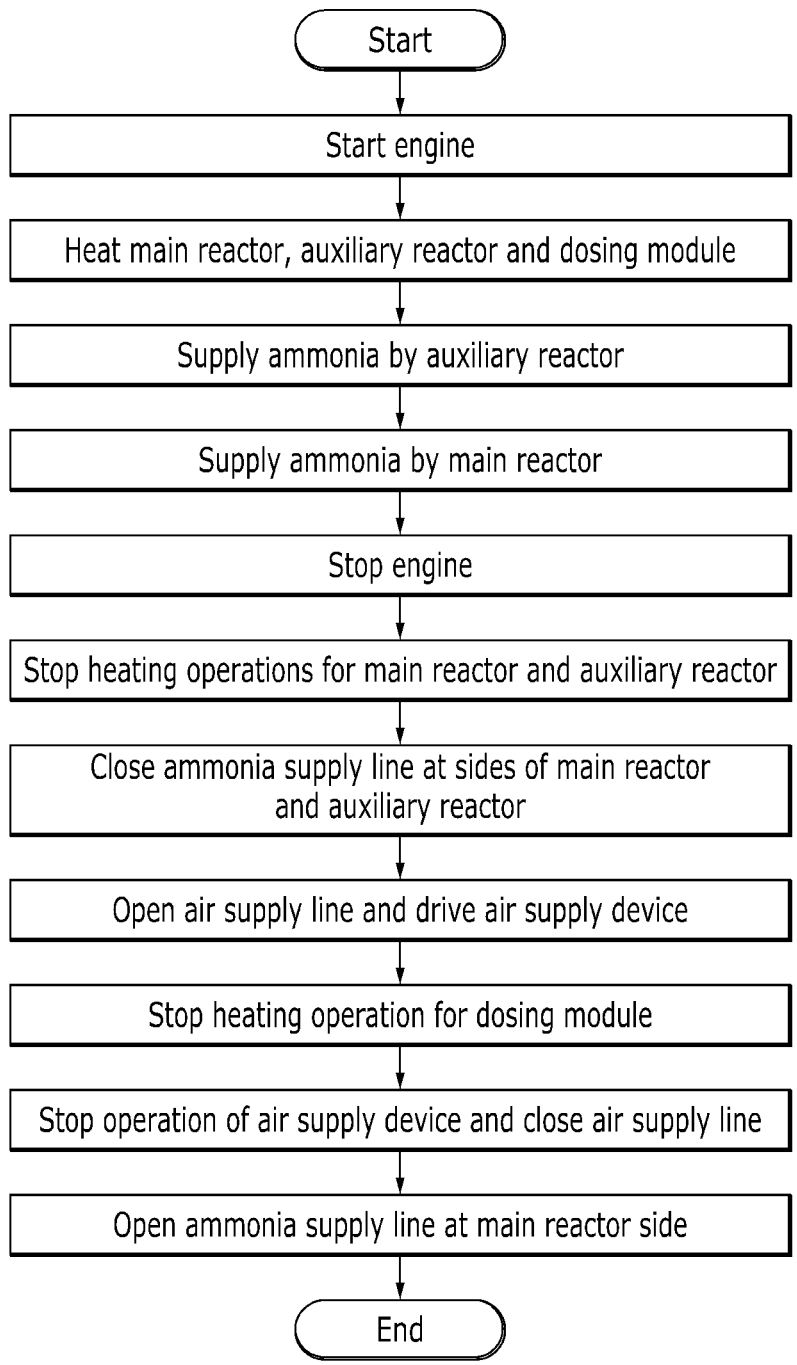
FIG. 13 is a flowchart illustrating an operational sequence of the exhaust gas purification system according to the fourth exemplary embodiment of the present invention.

FIG. 13 is a flowchart illustrating an operational sequence of the exhaust gas purification system according to the fourth exemplary embodiment of the present invention.

Hereinafter, a method of operating the exhaust gas treatment system according to the fourth exemplary embodiment of the present invention will be described with reference to FIG. 13.

First, when a user starts a vehicle in order to drive the vehicle, the user operates the heating means of the main reactor 100, the dosing module 200, and the auxiliary reactor 800 at the same time of starting the engine. At this time, the solid ammonium salt S accommodated in the auxiliary reactor 800 is rapidly heated by the fourth heating means 810 and converted into the ammonia, and the produced ammonia is supplied to the exhaust pipe 20 via the dosing module 200 and the injection nozzle 300 at the same time of starting the engine.

In addition, because an amount of the solid ammonium salt S accommodated in the auxiliary reactor 800 is small, the entire amount of the solid ammonium salt S is exhausted and the ammonia is not produced after a time point when the ammonia is produced and supplied from the main reactor 100 after the engine is started.

However, the fourth heating means 810 is continuously operated to prevent the auxiliary reactor 800 from being cooled by the outside environment.

Meanwhile, among the heating means for heating the main reactor 100 and the dosing module 100, the heating means, which use the electric heater 121 as a heat source, are operated at the same time of starting the engine, and the heating means, which use the exhaust gas or the cooling water as a heat source, are operated with the operation of the heating means, which use the electric heater 121 as a heat source, at a predetermined time difference.

Thereafter, when the exhaust gas or the cooling water has sufficient thermal energy, the heating means, which uses the electric heater 121 as a heat source, and the heating means, which uses the exhaust gas or the cooling water as a heat source, are simultaneously operated.

In addition, in an environment where a temperature of the main reactor 100 or the dosing module 200 is excessively increased, or the operation of the heating means, which use the electric heater 121 as a heat source, is not required, the operation of the heating means, which uses the electric heater 121 as a heat source, is stopped, and only the heating means, which uses the exhaust gas or the cooling water as a heat source, is operated.

Meanwhile, when the main reactor 100 is heated and the ammonia is produced from the solid ammonium salt S, an internal pressure in the main reactor 100 is increased by the produced ammonia.

Further, when the internal pressure in the main reactor 100 reaches a predetermined level, the ammonia produced in the main reactor 100 flows out of the main reactor 100 and flows into the dosing module 200.

The ammonia flowing into the dosing module 200 is supplied to the injection nozzle 300 in static pressure and in a fixed quantity, the ammonia supplied to the injection nozzle 300 is injected to the selective catalytic reduction 30 in the exhaust pipe in static pressure and in a fixed quantity, and the ammonia is mixed with the exhaust gas and discharged to the atmosphere after being purified by removing nitrogen oxide (NOx) by the selective catalytic reduction 30.

Meanwhile, when the user stops the engine, the heating operation for the main reactor 100 and the auxiliary reactor 800 is stopped. In addition, the ammonia supply line 400 at sides of the main reactor 100 and the auxiliary reactor 800 is closed and the air supply line 600a is opened by driving the opening and closing valve 410 at the same time of stopping the heating operation for the main reactor 100 and the auxiliary reactor 800.

When the air supply line 600a is opened, air is supplied to the dosing module 200 by driving the air supply device 500. Further, the air supplied to the dosing module 200 is discharged to the exhaust pipe 300 through the injection nozzle 300.

At this time, the ammonia supply line 400, the dosing module 200, and the injection nozzle 300 may be prevented from being clogged by the remaining ammonia which is coagulated in a solid state due to a decrease in temperature, by discharging the remaining ammonia together with the discharge of the air.

In addition, when the discharge of the remaining ammonia is completed by the air supply device 500a, the operation of the air supply device 500a and the heating operation for the dosing module 200 are stopped. Thereafter, the air supply line 600a is closed and the ammonia supply line 400 is opened by driving the opening and closing valve 410, and as a result the operation of the exhaust gas treatment system according to the fourth exemplary embodiment of the present invention is ended.

Meanwhile, an operation end time point of the exhaust gas treatment system according to the fourth exemplary embodiment of the present invention may be a time point when the heating operations for the air supply device 500a and the dosing module 200 are finished so that an amount of the ammonia, which is coagulated in the auxiliary reactor 800, may be increased, and in this case, the air supply line 500a may be closed and the ammonia supply line 400 may be opened by driving the opening and closing valve 410 at the same time of starting the engine.

Figure 14:
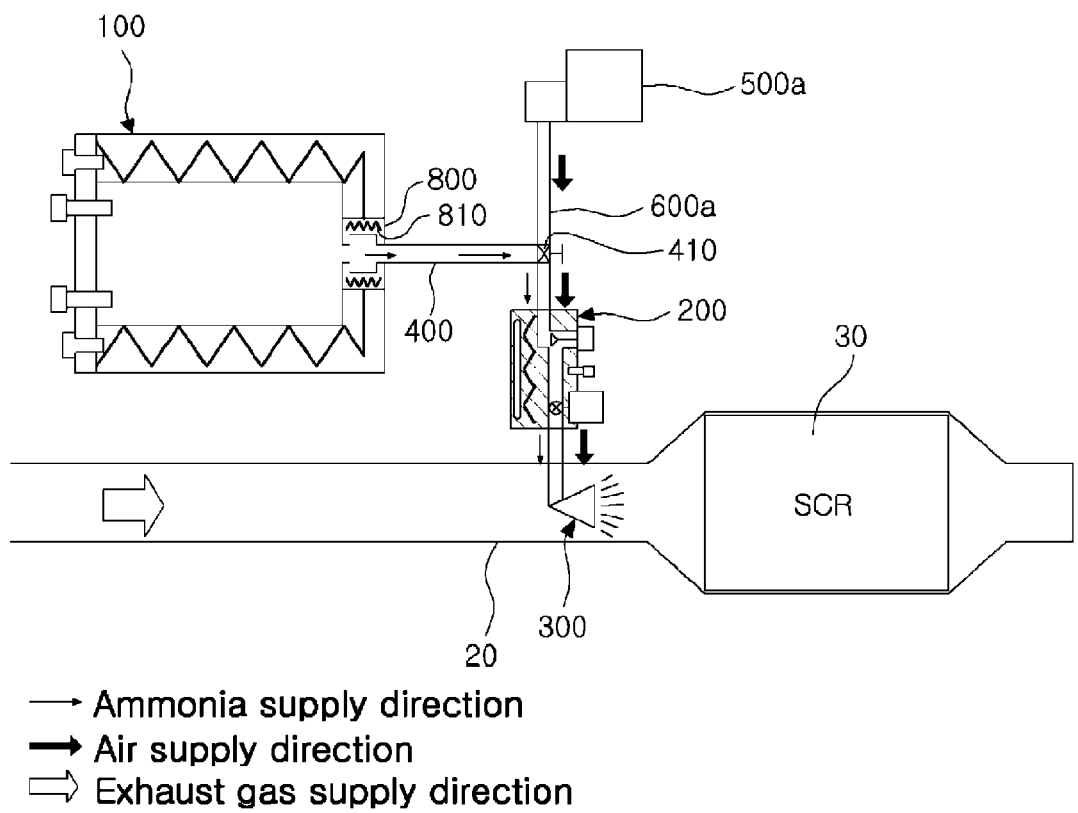
FIG. 14 is a schematic view illustrating an exhaust gas purification system according to a fifth exemplary embodiment of the present invention.

FIG. 14 is a schematic view illustrating an exhaust gas purification system according to a fifth exemplary embodiment of the present invention.

Referring to FIG. 14, an exhaust gas purification system according to a fifth exemplary embodiment of the present invention includes a main reactor 100 which produces ammonia from solid ammonium salt, an auxiliary reactor 800 provided at the main reactor 100, a dosing module 200 connected to the main reactor 100 to adjust a supply of the ammonia which is discharged from the main reactor 100 and the auxiliary reactor 800, and an injection nozzle 300 connected to the dosing module 200 and disposed in an exhaust pipe 20 to inject the ammonia to the exhaust pipe 20.

In addition, the exhaust gas purification system according to the fifth exemplary embodiment of the present invention may further include an electronic control unit (not illustrated) electrically connected to the main reactor 100, the dosing module 200, the auxiliary reactor 800, and a plurality of sensors to control production, supply, and flow of the ammonia.

Here, because the main reactor 100, the dosing module 200, the injection nozzle 300, and the electronic control unit are identical or similar to the configurations disclosed in the aforementioned exemplary embodiments, a specific description thereof will be omitted, and hereinafter a description will be given based on configurations different from those of the aforementioned exemplary embodiments.

In addition, the exhaust gas purification system according to the fifth exemplary embodiment of the present invention may include any one of the air supply device 500a, the exhaust gas supply device 500b, and the outside air supply device 500c, which are disclosed in the first exemplary embodiment to the third exemplary embodiment, and are connected to the ammonia supply line 400 between the main reactor 100 and the dosing module 200 in order to discharge the remaining ammonia to the outside after the engine is stopped.

The auxiliary reactor 800 is a configuration to supply the ammonia to the exhaust pipe 20 at the same time of starting the engine when the engine is started, and may be provided at the main reactor 100. More specifically, the auxiliary reactor 800 is disposed and installed at the wall to have a thickness corresponding to the wall of the housing in which the ammonia outlet 122 of the main reactor 100 is formed.

The auxiliary reactor 800 may have an internal space in which the solid ammonium salt S is accommodated, an ammonia inlet is adjacent to an accommodating space of the housing, and an ammonia outlet may be formed to be identical to the outlet 122 formed at the housing 120 of the main reactor 100.

In addition, the auxiliary reactor 800 may include a fourth heating means 810 which heats the accommodated solid ammonium salt S. Here, the fourth heating means 810 may be an electric heater in order to rapidly heat the accommodated solid ammonium salt S.

The aforementioned auxiliary reactor 800 produces the ammonia by rapidly heating the accommodated solid ammonium salt S, and therefore may prevent the exhaust gas from being discharged to the atmosphere in a state of not being purified during a delay time until the ammonia is discharged after being produced in the main reactor 100.

In addition, because an amount of the solid ammonium salt S accommodated in the auxiliary reactor 800 is small, the most amount of solid ammonium salt S may be exhausted at a time point when the solid ammonium salt S is heated in the main reactor 100 at the time of starting the engine until the ammonia is produced and discharged and the ammonia is produced.

In addition, after the engine is stopped, the remaining ammonia in the ammonia supply line 400 where the auxiliary reactor 800 is provided may be cooled and coagulated in a state of the solid ammonium salt in an accommodating portion of the auxiliary reactor 800. That is, the coagulated solid ammonium salt S is converted again into the ammonia at the time of starting the engine, and the exhaustion and the coagulation of the solid ammonium salt S may be repeatedly performed in the accommodating portion of the auxiliary reactor 800 in accordance with whether or not the engine is driven.

Figure 15:
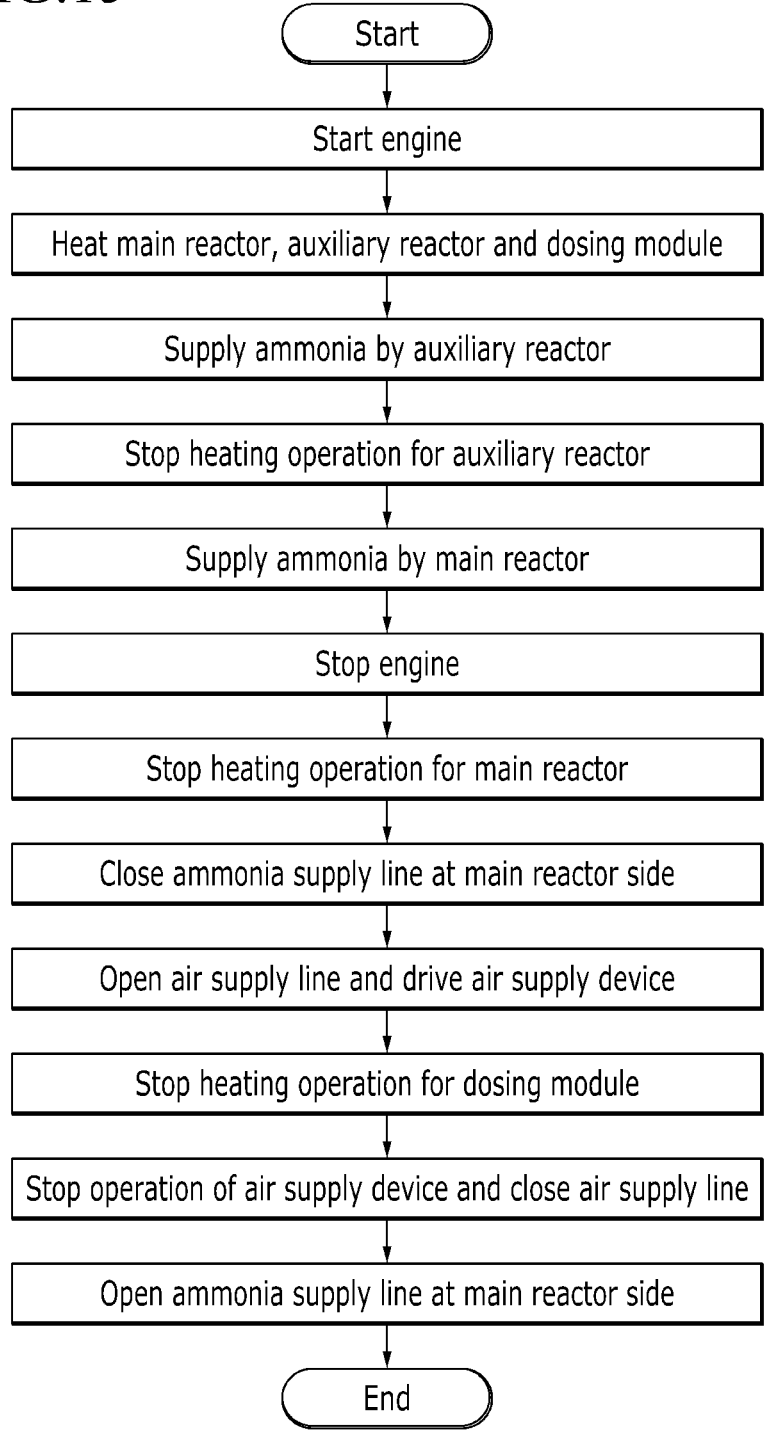
FIG. 15 is a flowchart illustrating an operational sequence of the exhaust gas purification system according to the fifth exemplary embodiment of the present invention.

FIG. 15 is a flowchart illustrating an operational sequence of the exhaust gas purification system according to the fifth exemplary embodiment of the present invention.

Hereinafter, a method of operating the exhaust gas treatment system according to the fifth exemplary embodiment of the present invention will be described with reference to FIG. 15.

First, when a user starts a vehicle in order to drive the vehicle, the user operates the heating means of the main reactor 100, the dosing module 200, and the auxiliary reactor 800 at the same time of starting the engine. At this time, the ammonia is produced by the auxiliary reactor 800 at the same time of starting the engine, and the produced ammonia is supplied to the exhaust pipe 20.

Meanwhile, because an amount of the solid ammonium salt S accommodated in the auxiliary reactor 800 is small, the operation of the fourth heating means 810 is stopped after a time point when the ammonia is produced and supplied from the main reactor 100 after the engine is started. The reason is that the auxiliary reactor 800 is in a state of receiving heat by the heating means provided at the main reactor 100 so as not to cause a problem that the auxiliary reactor 800 is cooled by the outside environment.

Thereafter, the operations from a time point when the engine is stopped to a time point when the operation is finished are identical or similar to the operations of the aforementioned fourth exemplary embodiment of the present invention, and thus hereinafter a specific description will be omitted.

The exhaust gas purification system according to various exemplary embodiments of the present invention, which is described above, may be used while replacing the solid ammonium salt S at a maintenance place in accordance with a period of maintenance, and therefore there is a merit in that separate social infrastructure construction is not necessary.

In addition, since the remaining ammonia is discharged through various fluids after the engine is stopped, various problems, which occur when the remaining ammonia is coagulated in a solid state in the ammonia supply line 400, the dosing module 200, and the injection nozzle 300, may be solved.

In addition, as the ammonia is quickly supplied by the auxiliary reactor 800 at the same time of starting the engine, the exhaust gas, which may be discharged in a state of not being purified during a delay time until the ammonia is produced from the main reactor 100, is purified, and as a result efficiency of exhaust gas purification may be maximized.

In addition, as the auxiliary reactor 800 is provided at the ammonia supply line 400 or the main housing 100, because separate configurations such as a back flow valve is not required, the system may be compactly manufactured, and the system may be easily mounted to a vehicle, which does not have the system.

Figure 16:
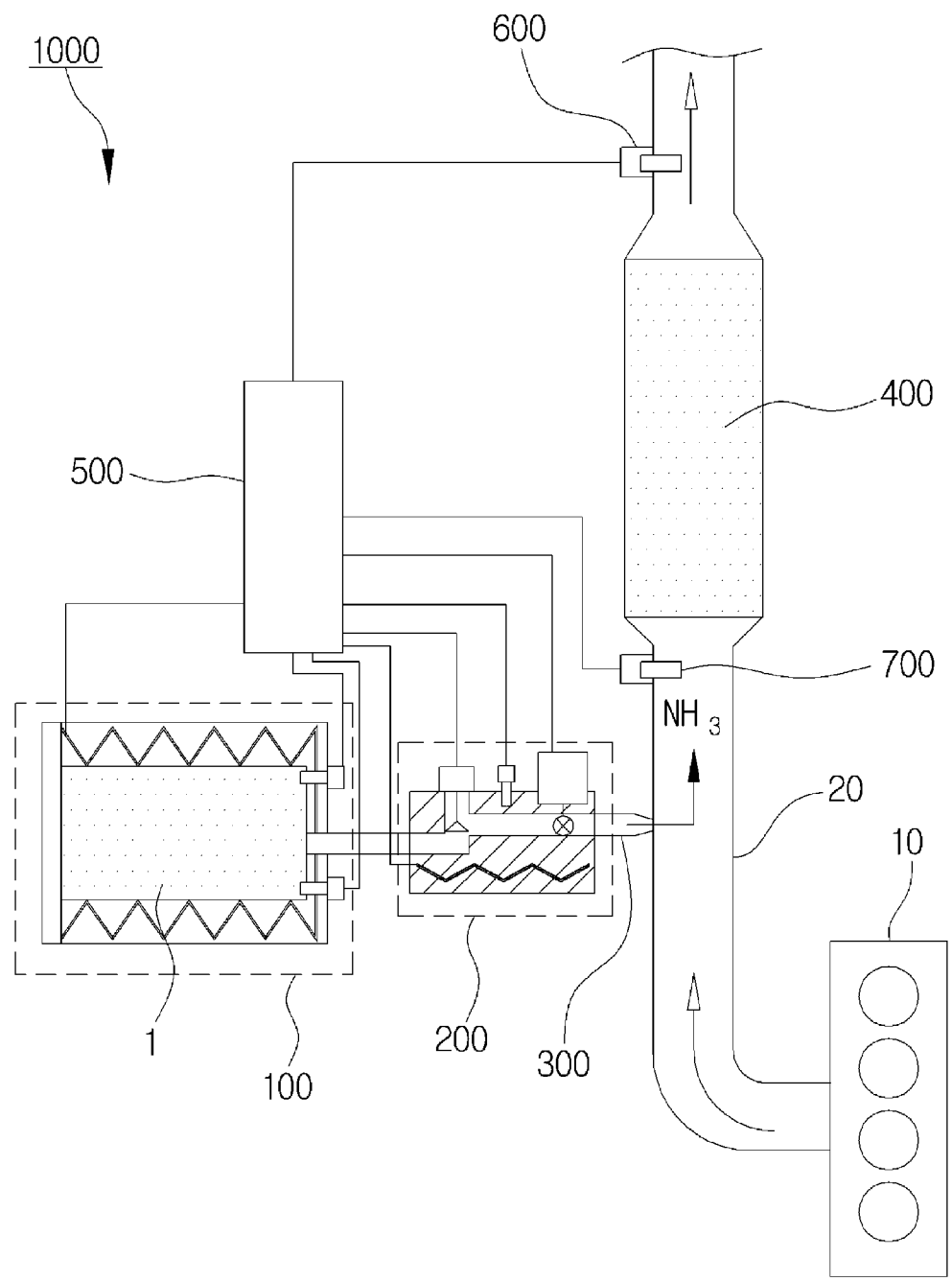
FIG. 16 is a schematic view illustrating an exhaust gas purification system according to a sixth exemplary embodiment of the present invention.

FIG. 16 is a schematic view illustrating an exhaust gas purification system according to the sixth exemplary embodiment of the present invention.

Referring to FIG. 16, an exhaust gas purification system according to the sixth exemplary embodiment of the present invention may include a main reactor 100, a dosing module 200, an injection nozzle 300, a selective catalytic reduction 400, and an electronic control unit 500.

Here, because the main reactor 100, the dosing module 200, the injection nozzle 300, and the electronic control unit 500 are identical or similar to the configurations disclosed in the aforementioned exemplary embodiments, a specific description thereof will be omitted, and hereinafter a description will be given based on configurations different from those of the aforementioned exemplary embodiments.

Here, the selective catalytic reduction 400 is installed in the exhaust pipe 20, and installed at a rear end of an exhaust pipe 20 where the injection nozzle 300 is installed. The selective catalytic reduction 400 serves to reduce nitrogen oxide included in the exhaust gas into nitrogen and water by mixing the nitrogen oxide with the ammonia which is injected to the exhaust pipe 20.

First, the main reactor 100 includes a solid ammonium salt cartridge (not illustrated), which may be replaced, in the housing. Because the solid ammonium salt cartridge may be used while being replaced at a maintenance place in accordance with a period of replacement, there is a merit in that separate social infrastructure construction is not necessary.

In addition, a fifth heating means may be provided at the housing to adjust a temperature.

Here, the fifth heating means is identical or similar to the first heating means which heats the main reactor of the first to the fourth exemplary embodiments.

In addition, the solid ammonium salt or solid ammonium salt cartridge accommodated in the main reactor 100 may be formed of ammonium-carbamate ($NH_2COONH_4$) or ammonium-carbonate (($NH_4)_2CO_3$). Because the aforementioned material is thermally decomposed into the ammonia at about 60° C., a temperature for an ammonia production reaction may be maintained to be low, and as a result there is a merit in that a small amount of electrical energy is used, and a by-product, which is produced by decomposition of the solid urea, is not produced in comparison with a case in which the solid urea is used.

A reaction equation in which the ammonia is produced by the thermal decomposition of the ammonium-carbamate and the ammonium-carbonate is as follows.

$$NH_2COONH_4 \leftrightarrow 2NH_3 + CO$$

$$(NH_4)_2CO_3 \leftrightarrow 2NH_3 + CO_2 + H_2O$$

Further, a representative reaction equation in which NOx is removed on the selective catalytic reduction 400 when the produced ammonia is injected to the exhaust pipe is as follows.

$$NO + NO_2 + 2NH_3 \rightarrow 2N_2 + 3H_2O$$

In addition, a temperature sensor and a pressure sensor, which are installed at the housing and connected to the electronic control unit 500, are further included. The fifth heating means may be controlled by the electronic control unit 500 in accordance with the temperature and the pressure measured by the temperature sensor and the pressure sensor.

In addition, a nitrogen oxide concentration measurement sensor 600, which is installed at a rear end of the exhaust pipe 20 where the selective catalytic reduction 400 is installed and connected to the electronic control unit 500, is further included. An injection amount of the ammonia may be adjusted by the ammonia dosing module 200 in accordance with the measured concentration of the nitrogen oxide.

That is, referring to FIG. 16, the concentration of the nitrogen oxide is measured by installing the nitrogen oxide concentration measurement sensor 600 at the exhaust pipe 20 at a rear end of the selective catalytic reduction 400, and the injection amount of the ammonia is adjusted in proportion to an amount of the nitrogen oxide remaining in the exhaust gas which has passed through the selective catalytic reduction 400. Accordingly, an amount of the nitrogen oxide in the exhaust gas which is discharged to the atmosphere may be maintained to be equal to or lower than an appropriate level, and the ammonia may be prevented from being excessively injected and discharged to the atmosphere.

In addition, an exhaust gas temperature sensor 700, which is installed at a front end of the exhaust pipe 20 where the selective catalytic reduction 400 is installed and connected to the electronic control unit 500, is further included, and a temperature of the ammonia dosing module 200 may be adjusted in accordance with the measured temperature.

Because a purification reaction of the nitrogen oxide is reduced when the temperature is lowered before the ammonia injected from the injection nozzle 300 reaches the selective catalytic reduction 400, the temperature is measured in advance by installing the exhaust gas temperature sensor 700 at the exhaust pipe 20 at a front end of the selective catalytic reduction 400. By controlling the temperature of the ammonia dosing module 200 through the electronic control unit 500, the temperatures of the exhaust gas and the ammonia, which flow into the selective catalytic reduction 400, may be maintained to be equal to or higher than about 180° C. at which the purification reaction of the nitrogen oxide is activated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| S: Solid ammonium salt | |
| 100: Main reactor | |
| 110: Cover | 120: Housing |
| 121, 250: Electric heater | 122: Ammonia outlet |
| 123, 270: Cooling water flow line | 124, 280: Exhaust gas flow line |
| 200: Dosing module | |
| 230: Pressure regulator | 240: Adjusting valve |
| 300: Injection nozzle | |

What is claimed is:

1. An exhaust gas purification system comprising:
a main reactor configured to produce ammonia from solid ammonium salt;
a dosing module connected to the main reactor to adjust a supply of the ammonia produced in the main reactor;
an injection nozzle installed in an exhaust pipe to inject the ammonia supplied from the dosing module to the exhaust pipe; and
an auxiliary reactor having an internal space in which solid ammonium is accommodated, and provided at an ammonia supply line, which connects the main reactor and the dosing module, along a length direction of the ammonia supply line,
wherein the main reactor comprises, a housing of which one side is formed to be opened; a solid ammonium salt cartridge provided in the housing; a cover coupled to the housing so that the opened one side of the housing is sealed; and an outlet formed at the other side of the housing and connected to the ammonia dosing module, and
wherein the auxiliary reactor includes a fourth heating means which heats the solid ammonium salt, and the auxiliary reactor produces ammonia until ammonia is discharged from the main reactor.

2. The exhaust gas purification system of claim 1, further comprising:
a gas supply device configured to supply gas to an ammonia supply line connected between the main reactor and the dosing module.

3. The exhaust gas purification system of claim 2, wherein:
the gas supply device is an air supply device which supplies air to the ammonia supply line.

4. The exhaust gas purification system of claim 3, wherein:
the air supply device is any one of an air tank, a blower, and an air compressor.

5. The exhaust gas purification system of claim 2, wherein:
the gas supply device is an exhaust gas supply device which supplies exhaust gas to the ammonia supply line.

6. The exhaust gas purification system of claim 5, wherein:
the exhaust gas supply device supplies the exhaust gas at a rear end side of a diesel particulate filter provided at the exhaust pipe to the ammonia supply line.

7. The exhaust gas purification system of claim 5, wherein:
the exhaust gas supply device is a blower, or an air compressor.

8. The exhaust gas purification system of claim 2, wherein:
the gas supply device is an outside air supply device which supplies outside air, which is supplied to a cylinder by a supercharger, to the ammonia line.

9. The exhaust gas purification system of claim 8, wherein:
the outside air supply device is a blower, or an air compressor.

10. The exhaust gas purification system of claim 2, wherein:
an opening and closing valve is positioned between the gas supply device and the ammonia supply line.

11. The exhaust gas purification system of claim 10, wherein:
the opening and closing valve is a two directional (two-way) valve, or a three directional (three-way) valve.

12. The exhaust gas purification system of claim 1, wherein:
a first heating means configured to heat the solid ammonium salt is provided at the main reactor.

13. The exhaust gas purification system of claim 12, wherein:
the first heating means uses at least one of an electric heater, exhaust gas, and cooling water as a heat source.

14. The exhaust gas purification system of claim 1, wherein:
at least one of an exhaust gas flow path through which exhaust gas flows, and a cooling water flow path through which cooling water flows, is formed at the main reactor.

15. The exhaust gas purification system of claim 14, wherein:
the exhaust gas flow path is connected to an exhaust gas inlet pipe into which the exhaust gas flows from the exhaust pipe, and an exhaust gas outlet pipe which allows the flowing exhaust gas to flow out to the exhaust pipe.

16. The exhaust gas purification system of claim 15, wherein:
a blower is coupled to the exhaust gas outlet pipe.

17. The exhaust gas purification system of claim 1, wherein:
the main reactor comprises
a sensor unit provided at the cover.

18. The exhaust gas purification system of claim 17, wherein:
the sensor unit includes at least one of a pressure sensor, and a temperature sensor.

19. The exhaust gas purification system of claim 1, wherein:
a third heating means is provided at the dosing module.

20. The exhaust gas purification system of claim 19, wherein:
the third heating means uses at least one of an electric heater, exhaust gas, and cooling water as a heat source.

21. The exhaust gas purification system of claim 1, wherein:
the dosing module comprises
at least one of an exhaust gas flow path through which exhaust gas flows and a cooling water flow path through which cooling water flows.

22. The exhaust gas purification system of claim 1, wherein:
the dosing module comprises
a valve body,
an ammonia flow path formed to penetrate the valve body,
a pressure regulator provided at the ammonia flow path to adjust ammonia flow pressure,
an adjusting valve provided at the ammonia flow path to adjust a discharge amount of the ammonia, and
a temperature sensor provided at the valve body.

23. The exhaust gas purification system of claim 1, wherein:
the fourth heating means is an electric heater.

24. The exhaust gas purification system of claim 1, wherein:
the auxiliary reactor is heated at the same time of starting an engine, and a heating operation is stopped at the same time of stopping the engine.

25. The exhaust gas purification system of claim 1, wherein:
the auxiliary reactor is heated at the same time of starting an engine, and heated before the engine is stopped.

26. The exhaust gas purification system of claim 1, further comprising:
a selective catalytic reduction installed in the exhaust pipe to reduce the nitrogen oxide into nitrogen and water by mixing nitrogen oxide included in exhaust gas with the ammonia injected to the exhaust pipe; and
an electronic control unit connected to the main reactor and the dosing module to control production and supply of the ammonia.

27. The exhaust gas purification system of claim 26, wherein:
a fifth heating means provided at the housing and connected to the electronic control unit.

28. The exhaust gas purification system of claim 27, wherein:
the fifth heating means uses at least one of an electric heater, exhaust gas, and cooling water as a heat source.

29. The exhaust gas purification system of claim 28, further comprising:
a temperature sensor and a pressure sensor installed at the housing and connected to the electronic control unit.

30. The exhaust gas purification system of claim 26, further comprising:
a nitrogen oxide concentration measurement sensor installed at a rear end of the exhaust pipe where the selective catalytic reduction is installed.

31. The exhaust gas purification system of claim 26, further comprising:
an exhaust gas temperature sensor installed at a front end of the exhaust pipe where the selective catalytic reduction is installed,
wherein a temperature of the dosing module is adjusted in accordance with the measured temperature.

32. The exhaust gas purification system of claim 1, wherein:
the solid ammonium salt is ammonium-carbamate ($NH_2COONH_4$) or ammonium-carbonate (($NH_4)_2CO_3$).

* * * * *